US012526586B2

(12) United States Patent
Pedersen et al.

(10) Patent No.: US 12,526,586 B2
(45) Date of Patent: Jan. 13, 2026

(54) HEARING DEVICE COMPRISING AN OWN VOICE ESTIMATOR

(71) Applicant: Oticon A/S, Smørum (DK)

(72) Inventors: Michael Syskind Pedersen, Smørum (DK); Jesper Jensen, Smørum (DK); Svend Oscar Peteresn, Smørum (DK); Jan Marinus De Haan, Smørum (DK)

(73) Assignee: Oticon A/S, Smørum (DK)

( * ) Notice: Subject to any disclaimer, the term of this patent is extended or adjusted under 35 U.S.C. 154(b) by 191 days.

(21) Appl. No.: 18/440,984

(22) Filed: Feb. 14, 2024

(65) Prior Publication Data

US 2024/0284123 A1 Aug. 22, 2024

(30) Foreign Application Priority Data

Feb. 16, 2023 (EP) .................................... 23157004

(51) Int. Cl.
*H04R 25/00* (2006.01)
*G10L 17/18* (2013.01)

(52) U.S. Cl.
CPC ............ *H04R 25/407* (2013.01); *G10L 17/18* (2013.01); *H04R 25/405* (2013.01); (Continued)

(58) Field of Classification Search
CPC .. H04R 25/407; H04R 25/405; H04R 25/507; H04R 2225/0216; H04R 2225/43; H04R 2225/025; H04R 2225/41; H04R 2460/13; H04R 25/50; G10L 17/18; G10L 21/0208; G10L 25/78; G10L 2021/02166
See application file for complete search history.

(56) References Cited

U.S. PATENT DOCUMENTS 6,661,901 B1 12/2003 Svean et al.
2015/0304782 A1 10/2015 Zurbrugg
2018/0359572 A1 12/2018 Jensen et al.

FOREIGN PATENT DOCUMENTS

EP 3328097 A1 5/2018
EP 3588981 A1 1/2020
(Continued)

OTHER PUBLICATIONS

Hidden Markov Models and Multiple Transfer Functions for Voice Subtraction in an Acoustic Dosimeter, Valerio Montagnani & Edmondo Trentin, Circutits Systems Signal Processing, vol. 26, No. 3, 2007, pp. 311-323, XP19540519A.
(Continued)

*Primary Examiner* — Tuan D Nguyen

(57) ABSTRACT

Disclosed herein are embodiments of a hearing device including at least one first, outward-facing, input transducer configured to pick up first sounds from the environment of a user and a second, inward-facing, input transducer configured to pick up a second sounds at the eardrum of the user. The hearing device can further include a directional system including a) an own voice beamformer configured to provide an estimate of the user's own voice in dependence of the at least one first and the second electric input signals and configurable own voice beamformer weights; and b) an own voice analyzer configured to analyze at least one of the at least one first and said second electric input signals, or to analyze a signal or signals originating therefrom, and to provide an own voice beamformer weight control signal.

15 Claims, 9 Drawing Sheets

(52) U.S. Cl.
CPC ... *H04R 25/507* (2013.01); *H04R 2225/0216* (2019.05); *H04R 2225/43* (2013.01)

(56) References Cited

FOREIGN PATENT DOCUMENTS

| | | | |
|---|---|---|---|
| EP | 3883266 | A1 | 9/2021 |
| WO | 2004077090 | A1 | 9/2004 |

OTHER PUBLICATIONS

J. Jensen and M. S. Pedersen, "Analysis of Beamformer Directed Single-Channel Noise Reduction System for Hearing Aid Applications," Proc. Int. Conf. Acoust., Speech, Signal Processing, pp. 5728-5732, Apr. 2015.

HEARING DEVICE COMPRISING AN OWN VOICE ESTIMATOR

TECHNICAL FIELD

The present application relates to the field of hearing devices, e.g. hearing aids or headsets. The present application relates e.g. to voice-based adaptation of directional weights or transfer functions for own voice pick-up or estimation.

SUMMARY

A hearing device may comprise at least an ITE-part adapted for being located at least partly in an ear canal of a user. The hearing device comprises at least two input transducers (an input transducer may be selected among a microphone and a vibration sensor). The hearing device may additionally comprise a BTE part adapted for being located at or behind an ear (pinna) of the user. The BTE- as well as the ITE-part may contain at least one input transducer. The ITE-part may contain an inward-facing input transducer. The inward-facing ITE-input transducer is in particular suitable for detecting and picking up own voice. In case the hearing device consists of the ITE-part, the ITE-part comprises an outward-facing input transducer (e.g. a microphone) as well as the inward-facing input transducer (e.g. a vibration sensor).

The user's own voice may in fact be picked up by both the inward-facing (ITE-) input transducer as well as the outward-facing (e.g. BTE-input transducer). Hence, it thus becomes possible to combine the different input transducer signals in order to achieve an improved, and possibly noise-reduced own voice signal. This is e.g. described in EP3883266A1.

Typically, the signals from the input transducers (e.g. microphones) are linearly combined by summing filtered versions of each signal together. This requires that the (relative) transfer functions (or the impulse response) from the mouth to each of the input transducers are known.

Whereas the acoustic transfer function between the mouth and the outward facing (e.g. BTE-) input transducers can be considered stationary, the transfer function from the mouth to the inward-facing input transducer reflects the transmission of sound through the human body (bones, skull, etc.) and depends on the type of utterance produced by the user. Voiced parts (e.g. vowel (and some consonant) sounds of a speech utterance are e.g. to a higher degree transferred via the skull than unvoiced parts (e.g. some consonant sounds, e.g. /t/, /p/, /k/) of an utterance. For that reason, it may be advantageous to adapt the relative own voice transfer function between the outward-facing and inward-facing input transducer (e.g. the BTE- and ITE-input transducer) based on the utterance, when building beamformer systems that rely on the relative transfer functions from mouth to input transducers.

A Hearing Device:

In an aspect of the present application, a hearing device configured to be worn at or in an ear of the user is provided. The hearing device comprises:

- at least one first, outward-facing, input transducer configured to pick up first sounds from the environment of the user and to provide respective first electric input signals representative of said first sounds;
- a second, inward-facing, input transducer configured to pick up a second sounds at the eardrum of the user and to provide a second electric input signal representative of said second sounds;
- a directional system configured to receive said at least one first and said second electric input signals and comprising an own voice beamformer configured to provide an estimate of the user's own voice in dependence of said at least one first and said second electric input signals and configurable own voice beamformer weights.

The hearing device may further comprise:

- an own voice analyzer configured to analyze at least one of said at least one first and said second electric input signals, or to analyze a signal or signals originating therefrom, and to provide an own voice beamformer weight control signal, the own voice analyzer comprising:
  - an own voice detector configured to estimate whether or not, or with what probability, a given input signal representative of sound originates from the voice of the user of the system, and to provide an own voice control signal indicative thereof;
  - an own voice classifier configured to classify, in dependence of the own voice control signal, an utterance from the user in at least two classes and to provide an own voice classification signal, and
  - an own voice beamformer controller configured to control said configurable own voice beamformer weights in dependence of said own voice classification signal, and providing said own voice beamformer weight control signal.

Thereby an improved own voice estimation may be provided.

The properties of the (first and second) input- and (and possible output-) transducers may assume that the hearing device is worn by the user.

The own voice classifier may be configured to classify (as a function of time) the own-voice speech signal into a number (e.g. two or more) of pre-specified signal classes.

The own voice beamformer controller may be configured to determine or select a current steering vector in dependence of the own voice classification signal and to determine the configurable own voice beamformer weights in dependence thereon. The steering vector comprises as its elements an acoustic transfer function from the location of the sound source (the user's own voice) to each of the input transducers of the hearing device. The steering vector describes the transfer function from the sound source (i.e. own voice or a part of the own voice signal (e.g. voiced part)) to the microphones. In fact, the steering vector may be a (collection of) relative transfer functions between a reference microphone and the other microphones. The actual transfer function from the sound source to the microphones would require access to the actual sound source, which in general is not available during use of the hearing device.

When own voice is transmitted (propagated) from the mouth to the at least one first, outward-facing, input transducer, (e.g. one or more outward-facing, 'external microphones', e.g. located in BTE-part or in an ITE-part of the hearing device), the source of the user's own voice can be regarded as a point source and that the own voice to be propagated from the mouth, along the head, where it reaches the outward-facing input transducer(s) (e.g. BTE- or ITE-microphones). In that case, the own voice source signal picked up by the (outward-facing) input transducers (e.g. microphones) can be characterized by a fixed transfer function, independent of from where in the speech production organ (the vocal fold, the nasal cavity or the teeth) the voice origins, cf. e.g. FIG. 7A.

However, the second, inward-facing input transducer (e.g. an in-ear canal microphone) does not 'see' the voice of the user as a single (point) source. It can be represented by a combination of different transfer functions depending on where in the speech production organ, the sound is generated. Voiced sounds, like vowels and nasal sounds, is to a higher degree passed via the skull compared to non-voiced sounds, like fricatives. Fricatives may e.g. be characterized as consonant sounds generated by an airflow through a narrow channel, e.g. between the lower lip and the upper teeth. In an embodiment, each separate own voice transfer function corresponds to a specific location of the origin of the sound (e.g. teeth, vocal tract, nose). In another embodiment each separate own voice transfer function is estimated based on the type of phoneme. Different phonemes may be grouped based on the similarity of their own voice transfer function.

For that reason, the transfer function between the outer (outward-facing) and inner (inward-facing) microphone may rather be described as a sum of speech-relevant sounds, each having their own transfer function. And the combined own voice sound may thus not be well described as a single point source, solely originating from the mouth.

When we mention adaptation, we refer to adapting between the different speech production-related transfer functions.

Or the problem may as well be turned around and the estimated speech production transfer function may be used to e.g. label the different speech components e.g. as either voiced unvoiced sounds.

The hearing device may comprise an ITE-part adapted to be located at or fully or partially in an ear canal of the user, wherein said ITE-part comprises the second, inward-facing, input transducer. The ITE-part may comprise an output transducer. The output transducer may comprise a loudspeaker or a vibrator of a bone conduction hearing device. Especially, the ITE microphone may be polluted by the output transducer sound while own voice is present. This requires a good feedback cancellation system. In an embodiment, the sound generated by the output transducer is subtracted from the recorded microphone signals before the sound is analyzed (by the own voice analyzer).

The second, inward-facing, input transducer may comprise a vibration sensor. The vibration sensor may e.g. comprise a vibration microphone or an accelerometer.

The second, inward-facing, input transducer may comprise an accelerometer. The accelerometer may have a sample rate of at least 500 Hz, at least 1000 Hz, at least 2000 Hz or at least 4000 Hz.

The hearing device may be configured to provide that the adaptive selection of own voice beamformer parameters vary across time and frequency. In other words, the hearing aid may be configured to provide that the configuration of the own voice beamformer weights vary across time and frequency. For example, the hearing is configured to provide that the determination of the configurable own voice beamformer weights vary across time and frequency.

The own voice classifier may be configured to provide the own voice classification signal in dependence of the own voice control signal. The own voice classifier may be configured to provide the own voice classification signal in dependence of the content of the utterance (e.g. its frequency spectrum). The own voice classifier may be frequency dependent to provide a frequency dependent classification signal.

The own voice classifier may be configured to provide the own voice classification signal in dependence of whether or not, or to which degree, a specific speech component is transmitted through the skull. Vowel (and some consonant) sounds of a speech utterance are e.g. to a higher degree transferred (propagated) via the skull than unvoiced parts (e.g. some consonant sounds, e.g. /t/, /p/, /k/) of an utterance. By analyzing the content of the own voice signal, this may be detected either from the content of the own voice signals or from the transfer function between the inward facing (e.g. ITE-) input transducer (e.g. microphone) and the outward-facing (e.g. BTE-) input transducer (e.g. microphones). By visually (or algorithmically) analyzing a spectrogram (the audio signal as function of time and frequency) voiced and unvoiced sounds are easy to localize (the detection of e.g. pitch would indicate a voiced sound). It may be advantageous to classify unvoiced sounds as own voice based on the transfer function between two outward-facing input transducers (e.g. BTE microphones), as there may be no or little unvoiced sound available at the inward-facing input transducer (e.g. ITE microphone), and we still have to determine if the unvoiced content origins from the user or from another person.

The own voice classifier may be configured to provide the own voice classification signal in dependence of one or more of the energy of the signal, the degree of voicing, e.g., unvoiced or voiced, a fundamental frequency, e.g. pitch content, a spectral tilt, a spectral centroid, and a spectral flatness.

The content of the utterance may be characterized by features describing the own voice speech signal. The characterizing features may e.g. include one or more of the energy of the signal, the degree of voicing, e.g., unvoiced or voiced, a fundamental frequency, e.g. pitch content, a spectral tilt, a spectral centroid, a spectral flatness of the own voice signal.

The own voice classifier may be configured to provide the own voice classification signal in dependence of a difference between the utterance picked up by the inward-facing input transducer (e.g. microphone) and the outward-facing input transducer (e.g. microphone), e.g. as a difference in input level or a difference in power spectral density of the corresponding electric input signals.

The differentiation between voiced or unvoiced speech and/or the selection of beamformer parameters may depend on a difference between the utterance picked up by the inward-facing input transducer and the outward-facing input transducer(s).

The own voice classifier may be based on a learning algorithm, e.g. a neural network, such as a deep neural network (e.g. a recurrent (e.g. comprising a layer implemented as gated recurrent unit (GRU)) or a convolutional neural network). The selection of parameters may be based on a neural network trained to select the optimal relative transfer function (among a set of candidates), given the electric input signals from the inward-facing and the outward-facing input transducers.

The hearing device may comprise a BTE-part adapted to be located at or behind an ear of the user, and wherein at least one of the at least one first, outward-facing, input transducers is located. The total number of first (outward-facing) and second (inward-facing) input transducers (e.g. microphones) may be larger than or equal to two, e.g. larger than or equal to three. The own voice beamformer may (hence) be based on two or more than two electric input signals. The more than two electric input signals may originate from input transducers (e.g. microphones) located in the BTE- and ITE-parts. The BTE-part may e.g. comprise at least two (first) input transducers (e.g. two BTE-microphones) and the ITE-part may comprise at least one input transducer (e.g. one ITE-microphone), e.g. at least the second (inward-facing) input transducer (e.g. a microphone or a vibration sensor).

In the case the hearing device comprises more than two input transducers (e.g. microphones), it may be advantageous to select the reference microphone (in the steering vector whose elements represent the relative transfer function between the different input transducers (e.g. microphones) with respect to a specific target source) as one of the BTE-microphones, as it can be assumed that the relative own voice transfer function between the two BTE microphones remains constant (during use of the hearing device). We thus only have to adapt/select the steering vector element between the (first) reference (BTE-)microphone and the (second) input transducer (e.g. an ITE microphone) in dependence of the type of own voice.

The hearing device may comprise antenna and transmitter circuitry allowing data, e.g. audio data, e.g. the estimate of the user's own voice, or a processed version thereof, to be transmitted to another device or system. The hearing device may comprise appropriate antenna and receiver circuitry allowing the hearing device to receive audio data from another device or system. The hearing device may comprise antenna and transceiver circuitry allowing a wireless communication-link to another device or system to be established (e.g. to a telephone or to an audio delivery device). The hearing device may be configured to allow an audio connection to be established between the hearing device and another device (e.g. a telephone or other communication device or another hearing device) to be established e.g. in a particular 'telephone' or 'headset' mode of operation of the hearing device). The hearing device may be configured to present sound received via another device or system via the antenna and receiver circuitry to the user via the output transducer (e.g. in a mixture of sound picked up from the environment by the first and/or second input transducers).

The hearing device may be constituted by or comprise an air-conduction type hearing aid, or a bone-conduction type of hearing aid, or a headset or earphones, or a combination thereof.

The hearing device (e.g. a hearing aid) may be adapted to provide a frequency dependent gain and/or a level dependent compression and/or a transposition (with or without frequency compression) of one or more frequency ranges to one or more other frequency ranges, e.g. to compensate for a hearing impairment of a user. The hearing device may comprise a signal processor for enhancing the input signals and providing a processed output signal.

The hearing device may comprise an output unit for providing a stimulus perceived by the user as an acoustic signal based on a processed electric signal. The output unit may (additionally or alternatively) comprise a transmitter for transmitting sound picked up-by the hearing device to another device, e.g. a far-end communication partner (e.g. via a network, e.g. in a telephone mode of operation, or in a headset configuration).

The hearing device may comprise an input unit for providing an electric input signal representing sound. The input unit may comprise an input transducer, e.g. a microphone, for converting an input sound to an electric input signal. The input unit may comprise a wireless receiver for receiving a wireless signal comprising or representing sound and for providing an electric input signal representing said sound.

The hearing device may be or form part of a portable (i.e. configured to be wearable) device, e.g. a device comprising a local energy source, e.g. a battery, e.g. a rechargeable battery. The hearing device may e.g. be a low weight, easily wearable, device, e.g. having a total weight less than 100 g, such as less than 20 g, such as less than 5 g.

The hearing device, e.g. the input unit, and or the antenna and transceiver circuitry may comprise a transform unit for converting a time domain signal to a signal in the transform domain (e.g. frequency domain or Laplace domain, Z transform, wavelet transform, etc.). The transform unit may be constituted by or comprise a TF-conversion unit for providing a time-frequency representation of an input signal. The time-frequency representation may comprise an array or map of corresponding complex or real values of the signal in question in a particular time and frequency range. The TF conversion unit may comprise a filter bank for filtering a (time varying) input signal and providing a number of (time varying) output signals each comprising a distinct frequency range of the input signal. The TF conversion unit may comprise a Fourier transformation unit (e.g. a Discrete Fourier Transform (DFT) algorithm, or a Short Time Fourier Transform (STFT) algorithm, or similar) for converting a time variant input signal to a (time variant) signal in the (time-)frequency domain.

The hearing device may comprise a number of detectors configured to provide status signals relating to a current physical environment of the hearing device (e.g. the current acoustic environment), and/or to a current state of the user wearing the hearing device, and/or to a current state or mode of operation of the hearing device. Alternatively or additionally, one or more detectors may form part of an external device in communication (e.g. wirelessly) with the hearing device. An external device may e.g. comprise another hearing device, a remote control, and audio delivery device, a telephone (e.g. a smartphone), an external sensor, etc.

One or more of the number of detectors may operate on the full band signal (time domain). One or more of the number of detectors may operate on band split signals ((time-) frequency domain), e.g. in a limited number of frequency bands.

The number of detectors may comprise a level detector for estimating a current level of a signal of the forward path. The detector may be configured to decide whether the current level of a signal of the forward path is above or below a given (L-)threshold value. The level detector operates on the full band signal (time domain). The level detector operates on band split signals ((time-) frequency domain).

The hearing device may comprise a voice activity detector (VAD) for estimating whether or not (or with what probability) an input signal comprises a voice signal (at a given point in time). A voice signal may in the present context be taken to include a speech signal from a human being. It may also include other forms of utterances generated by the human speech system (e.g. singing). The voice activity detector unit may be adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). The voice activity detector may be adapted to detect as a VOICE also the user's own voice. Alternatively, the voice activity detector may be adapted to exclude a user's own voice from the detection of a VOICE.

The hearing device comprises an own voice detector for estimating whether or not (or with what probability) a given input sound (e.g. a voice, e.g. speech) originates from the voice of the user of the system. A microphone system of the hearing device may be adapted to be able to differentiate between a user's own voice and another person's voice and possibly from NON-voice sounds. The own voice detector may be configured to classify the own-voice components of the input signal, e.g. in voiced or non-voiced sounds according to the present disclosure.

The number of detectors may comprise an inertial measurement unit, e.g. comprising one or more movement detectors. The number of detectors may comprise a movement detector, e.g. an acceleration sensor. The movement detector may be configured to detect movement of the user's facial muscles and/or bones, e.g. due to speech or chewing (e.g. jaw movement) and to provide a detector signal indicative thereof. The movement detector may be used as an inward-facing 'microphone' to pick up the user's own voice in an ear canal of the user.

The hearing device may comprise an acoustic (and/or mechanical) feedback control (e.g. suppression) or echo-cancelling system. Adaptive feedback cancellation has the ability to track feedback path changes over time. It is typically based on a linear time invariant filter to estimate the feedback path, but its filter weights are updated over time. The filter update may be calculated using stochastic gradient algorithms, including some form of the Least Mean Square (LMS) or the Normalized LMS (NLMS) algorithms. They both have the property to minimize the error signal in the mean square sense with the NLMS additionally normalizing the filter update with respect to the squared Euclidean norm of some reference signal.

The hearing device may further comprise other relevant functionality for the application in question, e.g. compression, noise reduction, etc.

Use:

In an aspect, use of a hearing device as described above, in the 'detailed description of embodiments' and in the claims, is moreover provided. Use may be provided in a system comprising one or more hearing devices (e.g. hearing instruments), headsets, earphones, active ear protection systems, etc., e.g. in handsfree telephone systems, teleconferencing systems (e.g. including a speakerphone), public address systems, karaoke systems, classroom amplification systems, etc.

A Method:

In an aspect, a method of operating a hearing device configured to be worn at or in an ear of the user is provided by the present disclosure. The hearing device comprises:

- at least one first, outward-facing, input transducer configured to pick up first sounds from the environment of the user;
- a second, inward-facing, input transducer configured to pick up a second sounds at the eardrum of the user.

The method comprises:

- providing by said at least one first, outward-facing, input transducer respective first electric input signals representative of said first sounds;
- providing second, inward-facing, input transducer a second electric input signal representative of said second sounds;
- providing an estimate of the user's own voice in dependence of said at least one first and said second electric input signals and configurable own voice beamformer weights.

The method may further comprise:

- analyzing at least one of said at least one first and said second electric input signals, or a signal or signals originating therefrom, and providing an own voice beamformer weight control signal;
- estimating whether or not, or with what probability, a given input signal representative of sound originates from the voice of the user of the system, and providing an own voice control signal indicative thereof;
- classifying, in dependence of the own voice control signal, an utterance from the user in at least two classes and providing an own voice classification signal indicative thereof; and
- providing said own voice beamformer weight control signal for controlling said configurable own voice beamformer weights in dependence of said own voice classification signal.

It is intended that some or all of the structural features of the device described above, in the 'detailed description of embodiments' or in the claims can be combined with embodiments of the method, when appropriately substituted by a corresponding process and vice versa. Embodiments of the method have the same advantages as the corresponding devices.

A Computer Program:

A computer program (product) comprising instructions which, when the program is executed by a computer, cause the computer to carry out (steps of) the method described above, in the 'detailed description of embodiments' and in the claims is furthermore provided by the present application.

A Hearing System:

A 'hearing system' may refer to a system comprising one or two hearing devices, and a 'binaural hearing system' refers to a system comprising two hearing devices and being adapted to cooperatively provide audible signals to both of the user's ears. Hearing systems or binaural hearing systems may further comprise one or more 'auxiliary devices', which communicate with the hearing device(s) and affect and/or benefit from the function of the hearing device(s). Such auxiliary devices may include at least one of a remote control, a remote microphone, an audio gateway device, an entertainment device, e.g. a music player, a wireless communication device, e.g. a mobile phone (such as a smartphone) or a tablet or another device, e.g. comprising a graphical interface. Hearing devices, hearing systems or binaural hearing systems may e.g. be used for compensating for a hearing-impaired person's loss of hearing capability, augmenting or protecting a normal-hearing person's hearing capability and/or conveying electronic audio signals to a person. Hearing devices or hearing systems may e.g. form part of or interact with public-address systems, active ear protection systems, handsfree telephone systems, car audio systems, entertainment (e.g. TV, music playing or karaoke) systems, teleconferencing systems, classroom amplification systems, etc.

In a further aspect, a hearing system comprising a hearing device as described above, in the 'detailed description of embodiments', and in the claims, AND an auxiliary device is moreover provided.

The hearing system may be adapted to establish a communication link between the hearing device and the auxiliary device to provide that information (e.g. control and status signals, possibly audio signals) can be exchanged or forwarded from one to the other.

The auxiliary device may be constituted by or comprise a remote control, a smartphone, or other portable or wearable electronic device, such as a smartwatch or the like.

The auxiliary device may be constituted by or comprise a remote control for controlling functionality and operation of the hearing device(s), e.g. hearing aid(s). The function of a remote control may be implemented in a smartphone, the smartphone possibly running an APP allowing to control the functionality of the audio processing device via the smartphone (the hearing device(s) comprising an appropriate wireless interface to the smartphone, e.g. based on Bluetooth (e.g. LE Audio) or some other standardized or proprietary scheme).

The auxiliary device may be constituted by or comprise another hearing device (e.g. hearing aid). The hearing system may comprise two hearing devices adapted to implement a binaural hearing system, e.g. a binaural hearing aid system.

Embodiments of the disclosure may e.g. be useful in applications such as hearing aids or headsets or earphones (ear buds), etc.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

The invention is defined in the appended claims.

DETAILED DESCRIPTION OF EMBODIMENTS

The present application relates to the field of hearing devices, e.g. hearing aids or headsets. The present application relates e.g. to voice-based adaptation of directional weights or transfer functions for own voice pick-up or estimation.

In the present disclosure, a hearing device for own voice pickup comprising an ITE part having an inward-facing input transducer (facing the eardrum) is described. An outward-facing input transducer (e.g. a microphone) (facing the environment) may be located either in the ITE part or in a BTE part.

Figure 1A:
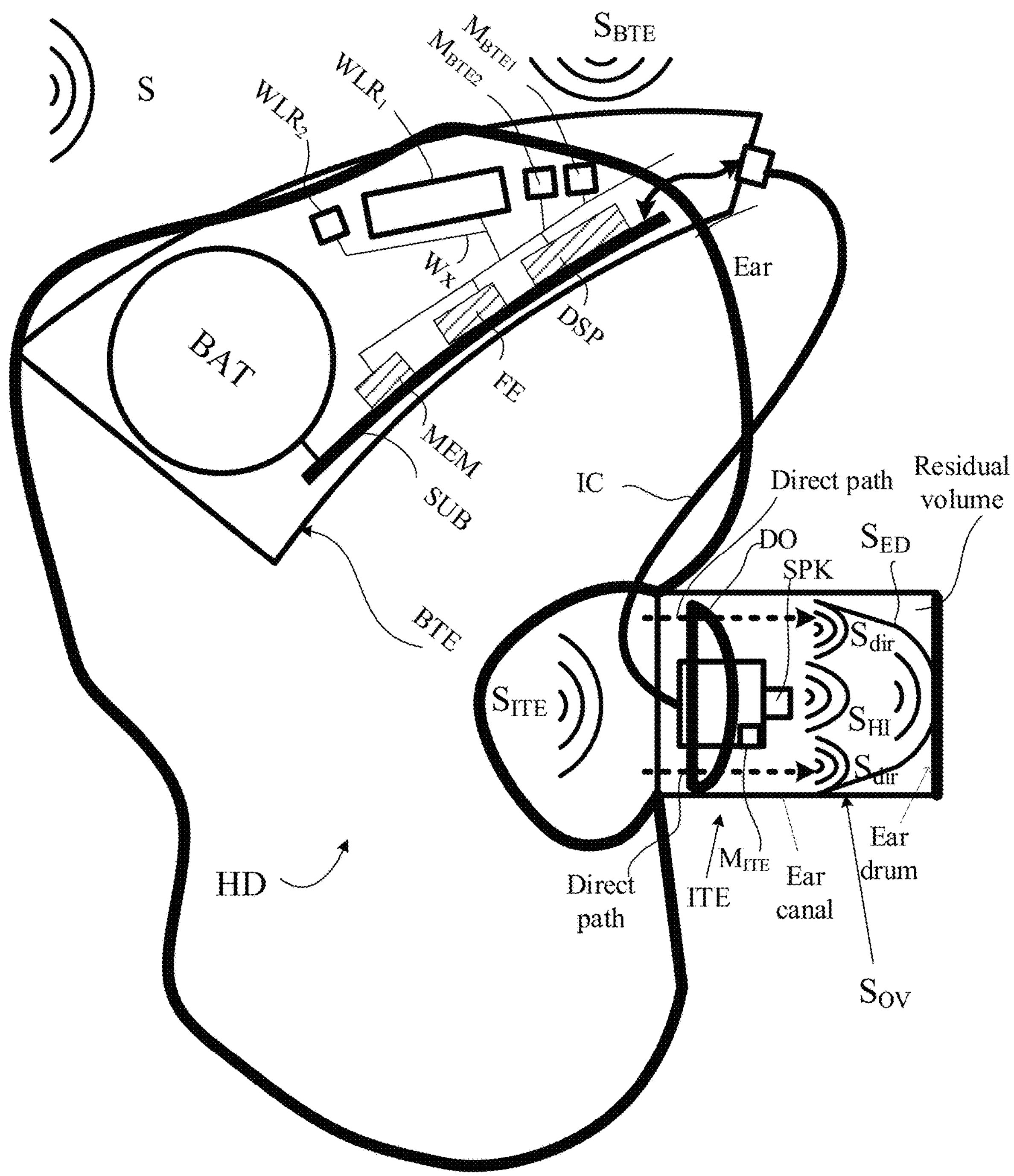
FIG. 1A shows a first embodiment of hearing device according to the present disclosure comprising an ITE- and a BTE-part, the ITE part comprising an inward-facing input transducer suitable for estimating the sound pressure level at the eardrum as well as picking up the user's own voice.
Figure 1B:
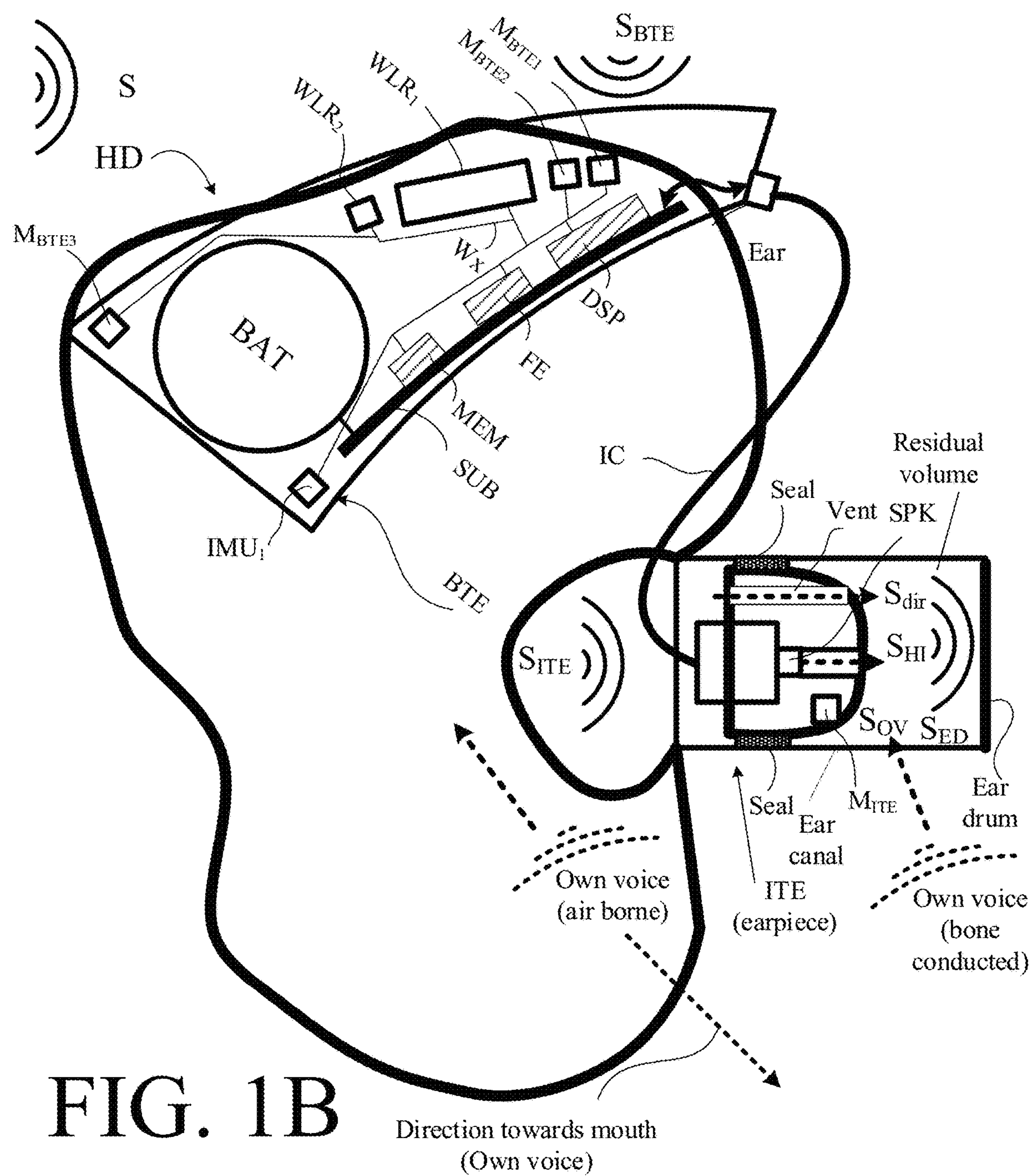
FIG. 1B shows a second embodiment of hearing device according to the present disclosure comprising an ITE- and a BTE-part, the ITE part comprising an inward-facing input transducer suitable for estimating the sound pressure level at the eardrum as well as picking up the user's own voice.

FIGS. 1A and 1B shows respective first and second embodiments of hearing device according to the present disclosure comprising an ITE- and a BTE-part, the ITE part comprising an inward-facing input transducer suitable for estimating the sound pressure level at the eardrum as well as picking up the user's own voice.

FIGS. 1A and 1B each shows an embodiment of a hearing device, e.g. a hearing aid, according to the present disclosure. The hearing device is here illustrated as a particular style (sometimes termed receiver-in-the ear, or RITE, style) comprising a BTE-part (BTE) adapted for being located at or behind an ear (pinna) of a user, and an ITE-part (ITE) adapted for being located in or at an ear canal of the user's ear and comprising an output transducer, e.g. a loudspeaker (SPK). The BTE-part and the ITE-part are connected (e.g. electrically connected) by a connecting element (IC) and internal wiring in the ITE- and BTE-parts (cf. e.g. wiring Wx in the BTE-part). The connecting element may alternatively be fully or partially constituted by a wireless link between the BTE- and ITE-parts.

In the embodiments of FIGS. 1A and 1B, the BTE part comprises an input unit comprising a number of input transducers (e.g. microphones) ($M_{BTEi}$, i=1, . . . , M), each for providing an electric input audio signal representative of an input sound signal ($S_{BTE}$) (originating from a sound field S around the hearing device). The input unit further comprises a number of (here two) wireless receivers ($WLR_1$, $WLR_2$) (or transceivers) for providing respective directly received auxiliary audio and/or control input signals (and/or allowing transmission of audio and/or control signals to other devices, e.g. a remote control or processing device, e.g. a telephone). The hearing device (HD) comprises a substrate (SUB) whereon a number of electronic components are mounted, including a memory (MEM) e.g. storing different hearing device programs (e.g. parameter settings defining such programs, or parameters of algorithms, e.g. optimized parameters of a neural network, e.g. beamformer weights of one or more (e.g. an own voice) beamformer(s)) and/or hearing device configurations, e.g. input source combinations (microphones and transceivers), e.g. optimized for a number of different listening situations or modes of operation. One mode of operation may be a communication mode (or 'telephone mode'), where the user's own voice is picked up by microphones of the hearing device and transmitted to another device or system via one of the wireless interfaces. The substrate further comprises a configurable signal processor (DSP, e.g. a digital signal processor, e.g. including a processor for applying a frequency and level dependent gain (e.g. for hearing loss compensation and/or noise reduction), e.g. providing one or more of beamforming, noise reduction, filter bank functionality, and other digital functionality of a hearing device according to the present disclosure). The configurable signal processor (DSP) is adapted to access the memory (MEM) and for selecting and processing one or more of the electric input audio signals and/or one or more of the directly received auxiliary audio input signals based on a currently selected (activated) hearing device program/parameter setting, e.g. an appropriate own-voice beamformer setting according to the present disclosure (e.g. either automatically selected, e.g. based on one or more sensors, or after analysis of electric input signals (e.g. by an own-voice analysis unit (OVAN), cf. e.g. FIG. 6), and/or selected or configured based on inputs from a user interface). The mentioned functional units (as well as other components) may be partitioned in physical circuits and components according to the application in question (e.g. with a view to size, power consumption, analogue vs. digital processing, etc.), e.g. integrated in one or more integrated circuits, or as a combination of one or more integrated circuits and one or more separate electronic components (e.g. inductor, capacitor, etc.). The configurable signal processor (DSP) provides a processed audio signal, which is intended to be presented to a user of the hearing device, and/or an estimate of the user's own voice, which is intended to be transmitted to another device or system. The substrate further comprises a front-end IC (FE) for interfacing the configurable signal processor (DSP) to the input and output transducers, etc., and typically comprising interfaces between analogue and digital signals. The input and output transducers may be individual separate components, or integrated (e.g. MEMS-based) with other electronic circuitry.

The hearing device (HD) further comprises a (first) output unit (e.g. an output transducer) providing stimuli perceivable by the user as sound based on a processed audio signal from the processor or a signal derived therefrom. In the embodiments of a hearing device in FIGS. 1A and 1B, the ITE part comprises the output unit in the form of a loudspeaker (also sometimes termed a 'receiver') (SPK) for converting an electric signal to an acoustic (air borne) signal ($S_{HI}$), which (when the hearing device is mounted at an ear of the user) is directed towards the ear drum (Ear drum), where sound signal ($S_{ED}$) is provided (possibly including bone conducted sound ($S_{OV}$) (directly) from the user's mouth, and sound from the environment ($S_{dir}$) 'leaking around or through' the ITE-part and into the 'residual volume').

In the embodiment of a hearing device in FIG. 1A, the input unit of the BTE part comprises two input transducers (e.g. microphones) ($M_{BTE1}$, $M_{BTE2}$), e.g. located in the top part of the BTE-housing, e.g. having a 'microphone axis' extending in a direction of a target sound source, e.g. in a horizontal direction (e.g. towards a communication partner in a hearing aid application) or a direction of the user's mouth (in a headset application or a 'telephone mode' of a hearing aid application), when the user is wearing the hearing device.

In the embodiment of a hearing device in FIG. 1B (which is nearly identical to the embodiment of FIG. 1A), the input unit of the BTE part comprises three (first) input transducers (e.g. microphones) ($M_{BTE1}$, $M_{BTE2}$, $M_{BTE3}$). Two of the input transducers (e.g. microphones) ($M_{BTE1}$, $M_{BTE2}$) are located in the top part of the BTE-housing, as described in connection with the embodiment of FIG. 1A. The third input transducer ($M_{BTE3}$) is located in a bottom part of the BTE-housing, e.g. at an angle to the 'microphone axis' of the other input transducers ($M_{BTE1}$, $M_{BTE2}$).

In the embodiment of a hearing device in FIGS. 1A and 1B, the ITE-part comprises an input transducer ($M_{ITE}$) facing the eardrum (inward-facing) configured to pick up sound from the 'residual volume', including (mainly) bone-conducted sound originating from the user's own voice. The hearing device may be configured to subtract (filter out) contributions to the sound field in the residual volume from the directly propagated sound ($S_{dir}$) and from the loudspeaker (SPK) of the hearing device ($S_{HI}$), by various active noise cancellation, active occlusion control, active hearing protection, and feedback cancellation techniques known in the art, see e.g. US2015304782A1. Thereby the contribution from the bone conducted sound reaching the residual volume (and including the user's own voice) may be isolated. The ITE-part may comprise other input transducers than the inward-facing input transducer ($M_{ITE}$). The ITE-part may e.g. comprise one or more outward-facing (i.e. environment-facing) input transducers. The ITE-part may e.g. comprise all the input transducers of the hearing device. The hearing device (HD) may be constituted by the ITE-part.

As mentioned, the sound (speech) picked up by the inward-facing input transducer (($M_{ITE}$) in FIG. 1A, 1B) is predominantly a bone-conducted part of the user's own voice. The outward-facing input transducers (($M_{BTE1}$, $M_{BTE2}$) in FIG. 1A and ($M_{BTE1}$, $M_{BTE2}$, $M_{BTE3}$) in FIG. 1B), on the other hand, predominantly pick up an air-conducted part of the user's own voice (in addition to other (air-conducted) sounds in the environment).

As shown in FIG. 1B, the hearing device (HD) may further comprise a detector unit comprising one or more inertial measurement units (IMU), e.g. one or more movement detectors such as e.g. a 3D gyroscope, a 3D accelerometer and/or a 3D magnetometer, here denoted $IMU_1$ and located in the BTE-part (BTE). Inertial measurement units (IMUs), e.g. comprising or being constituted by accelerometers, gyroscopes, and magnetometers, and combinations thereof, are available in a multitude of forms (e.g. multi-axis, such as 3D-versions), e.g. constituted by or forming part of an integrated circuit, and thus suitable for integration, even in miniature devices, such as hearing devices, e.g. hearing aids. The sensor $IMU_1$ may thus be located on the substrate (SUB) together with other electronic components (e.g. MEM, FE, DSP). One or more movement sensors (IMU) may alternatively or additionally be located in or on the ITE part (ITE) or in or on the connecting element (IC), e.g. used to pick up sound (e.g. bone-conducted sound) from the user's mouth (own voice).

The input transducer ($M_{ITE}$) of the ITE-part facing the eardrum may e.g. comprise or be constituted by a motion sensor, e.g. an accelerometer. Preferably, an accelerometer for own voice detection or own voice pickup has a sample rate of at least 500 Hz, at least 1000 Hz, at least 2000 Hz or at least 4000 Hz.

The ITE-part may (as shown in FIG. 1B) comprise a sealing and guiding element ('Seal') for guiding and positioning the ITE-part in the ear canal (Ear canal) of the user, and for separating the 'Residual volume' from the environment. Thereby the bone-conducted sound (picked up by the inward-facing input transducer is further isolated from the air-conducted sound picked up by the environment-facing input transducers. The ITE part (earpiece) may comprise a housing or a soft or rigid or semi-rigid dome-like structure. The housing of the ITE-part may be constituted by an ear mould.

The electric input signals to the hearing device may be processed in the time domain or in the (time-) frequency domain (or partly in the time domain and partly in the frequency domain as considered advantageous for the application in question).

The embodiment of FIG. 1A represents a relatively open fitting comprising an open dome (DO) through which air may be exchanged between the residual volume and the environment (thereby minimizing occlusion), including 'allowing' sound ($S_{dir}$) to propagate ('directly') from the environment to the eardrum (without being processed by the hearing device). The embodiment of FIG. 1B represents a relatively closed fitting comprising an earpiece (ITE (earpiece)) partially occluding the ear canal of the user. The earpiece comprises a ventilation channel (Vent) through which air may be exchanged between the residual volume and the environment (thereby reducing a sense of occlusion that would result from a full blockage of the ear canal by the earpiece). The dimensions of the ventilation channel are (among other things) a result of a compromise between a large cross-section minimizing the user's sense of occlusion (intended) and a small cross-section minimizing (unintended) directly propagated sound ($S_{dir}$) from the environment to the eardrum.

The hearing device (HD) exemplified in FIG. 1A, 1B is a portable device. The hearing device further comprises a battery (BAT), e.g. a rechargeable battery, e.g. based on Li-Ion battery technology, e.g. for energizing electronic components of the BTE- and possibly ITE-parts. The hearing device, e.g. a hearing aid, may be adapted to provide a frequency dependent gain and/or a level dependent compression and/or a transposition (with or without frequency compression) of one or more frequency ranges to one or more other frequency ranges, e.g. to compensate for a hearing impairment of a user. The hearing device of FIG. 1A, 1B may e.g. comprise or be constituted by a headset configured to transmit the user's own voice to another device or system and to receive audio from a such other device. The headset or hearing aid may e.g. be adapted to support 2-way-audio communication (e.g. representing a 'telephone' conversation) and one-way audio reception (e.g. to receive audio from an audio delivery device or system).

The hearing device may comprise an own-voice detector (cf. e.g. 'OVAD' in FIG. 2A and FIG. 6) for estimating whether or not (or with what probability) a given input sound (e.g. a voice, e.g. speech) originates from the voice of the user of the hearing device. Own-voice detectors based on a variety of physical principles are known in the art, see e.g. WO2004077090A1, EP3328097A1, or EP3588981A1. The hearing device may comprise a beamformer filter comprising an own voice beamformer (cf. e.g. FIG. 2A, 2B) configured to provide an estimate of the user's own voice in dependence of signals from (at least two) input transducers of the hearing device, including the inward-facing input transducer of the ITE-part of the hearing device, and configurable beamformer weights. Beamforming for estimating a user's own voice in a hearing aid or headset is e.g. dealt with in EP3588981A1 and EP3883266A1.

Figure 2A:
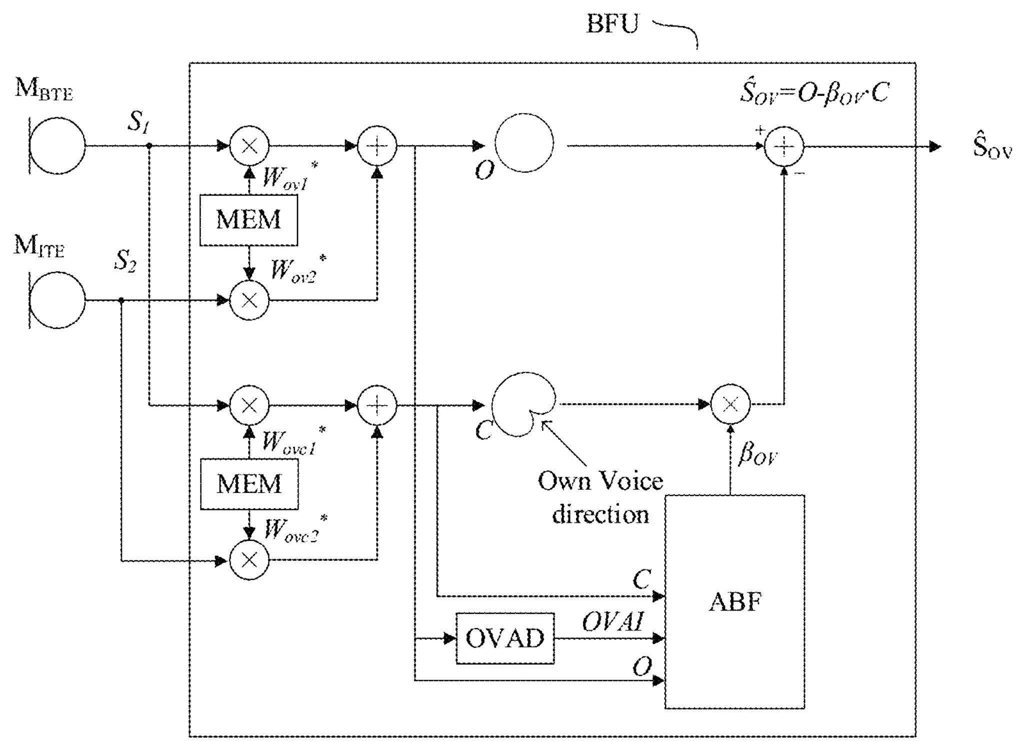
FIG. 2A shows a first embodiment of an adaptive beamformer filtering unit for providing a beamformed signal comprising the user's own voice based on two electric input signals.
Figure 2B:
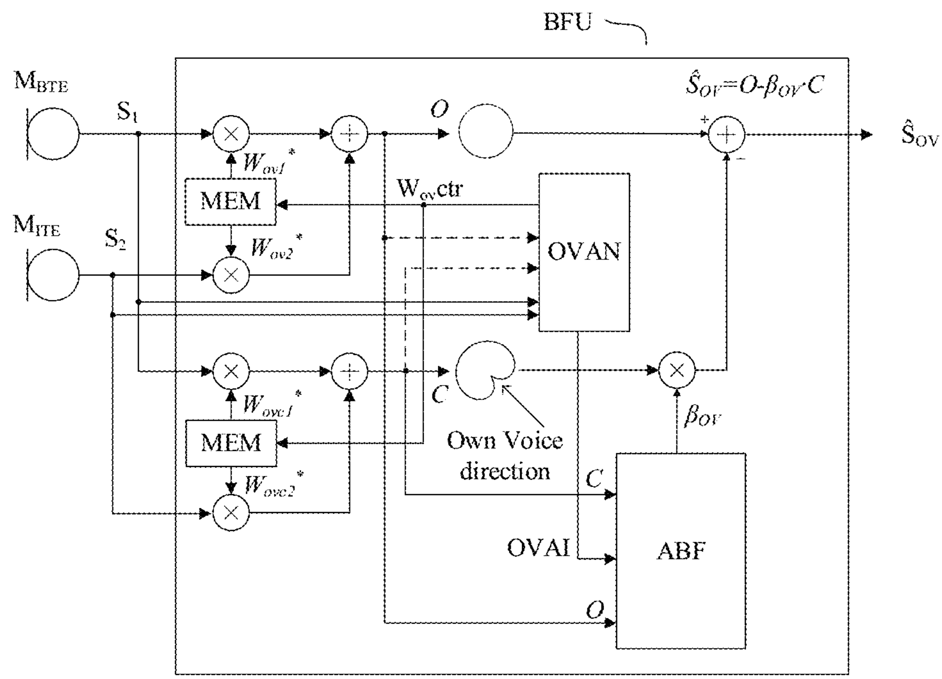
FIG. 2B shows a second embodiment of an adaptive beamformer filtering unit for providing a beamformed signal comprising the user's own voice based on two electric input signals.

FIGS. 2A and 2B shows first and second embodiments, respectively, of an adaptive beamformer filtering unit (implemented in a generalized sidelobe canceller (GSC) structure) for providing a beamformed signal based on two microphone inputs. FIGS. 2A and 2B each shows a part of a hearing device comprising first and second microphones ($M_1$ and $M_2$ in FIG. 8, but in FIGS. 2A, 2B denoted $M_{BTE}$ and $M_{ITE}$, respectively) providing respective first and second electric input signals $S_1$ and $S_2$, respectively and a beamformer filtering unit (BFU) providing a beamformed signal ($\hat{S}_{OV}$) based on the first and second electric input signals ($S_1$, $S_2$) and fixed and adaptive beamformer weights ($W_{xy}$, β). A direction from the source of the target signal (which in this case is the mouth of the user providing the user's own voice) to the hearing device microphones is indicated in FIG. 2A, 2B by arrow denoted 'Own Voice Direction'. An adaptive beam pattern, for a given frequency band k, k being a frequency band index, is obtained by linearly combining an omnidirectional delay-and-sum-beamformer (O (O(k))) and a delay-and-subtract-beamformer (C (C(k))) in that frequency band (as illustrated in FIG. 2A, 2B). The beamformer filtering unit (BFU) comprises an adaptive beamformer (ABF). The adaptive beam pattern arises by scaling the delay-and-subtract-beamformer (C(k)) by a complex-valued, frequency-dependent, adaptive scaling factor $\beta_{OV}$ (k) (generated by adaptive beamformer ABF) before subtracting it from the delay-and-sum-beamformer (O(k)), i.e. providing the beam pattern S, or beamformed signal $\hat{S}_{OV}$:

$$\hat{S}_{OV}(k) = O(k) - \beta_{OV}(k)C(k).$$

It should be noted that the sign in front of $\beta_{OV}(k)$ might as well be +, if the sign(s) of the weights constituting the delay-and-subtract beamformer C is appropriately adapted. Further, $\beta_{OV}(k)$ may be substituted by $\beta_{OV}^*(k)$, where * denotes complex conjugate, such that the beamformed signal $\hat{S}_{OV}$ is expressed as $\hat{S}_{OV}=(W_{ov}(k)-\beta_{OV}(k)\cdot W_{ovc}(k))^H\cdot S(k)$, where S(k) is the input vector $S(k)=[S_1(k), S_2(k)]^T$, where H denotes Hermitian transposition, and T denotes transposition.

In FIG. 2A, the beamformer weights ($W_{xy}$) of the two beamformers (O, C) of the own voice beamformer are fixed, where the weights are determined in advance and stored in memory (MEM). In FIG. 2B, the beamformer weights ($W_{xy}$) are adaptively updated (cf. own voice beamformer weight control signal ($W_{OV}$ctr) in FIG. 2B).

For example, FIG. 2A illustrates a first implementation of an adaptive beamformer filtering unit, e.g. of a beamformer filtering unit (BFU) comprising an adaptive beamformer (ABF). Embodiments of the present application may aim at improving implementation of the adaptive beamformer filtering unit illustrated in FIG. 2B, e.g., by allowing an adaptive update of the beamformer weights ($W_{xy}$). In other words, FIG. 2B provides a second implementation of an adaptive beamformer filtering unit aiming at improving the first implementation of the adaptive beamformer filtering unit illustrated in FIG. 2A. Put differently, FIG. 2B comprises an improvement over FIG. 2A.

The adaptation factor $\beta$ is linked to the GSC structure.

Figure 8:
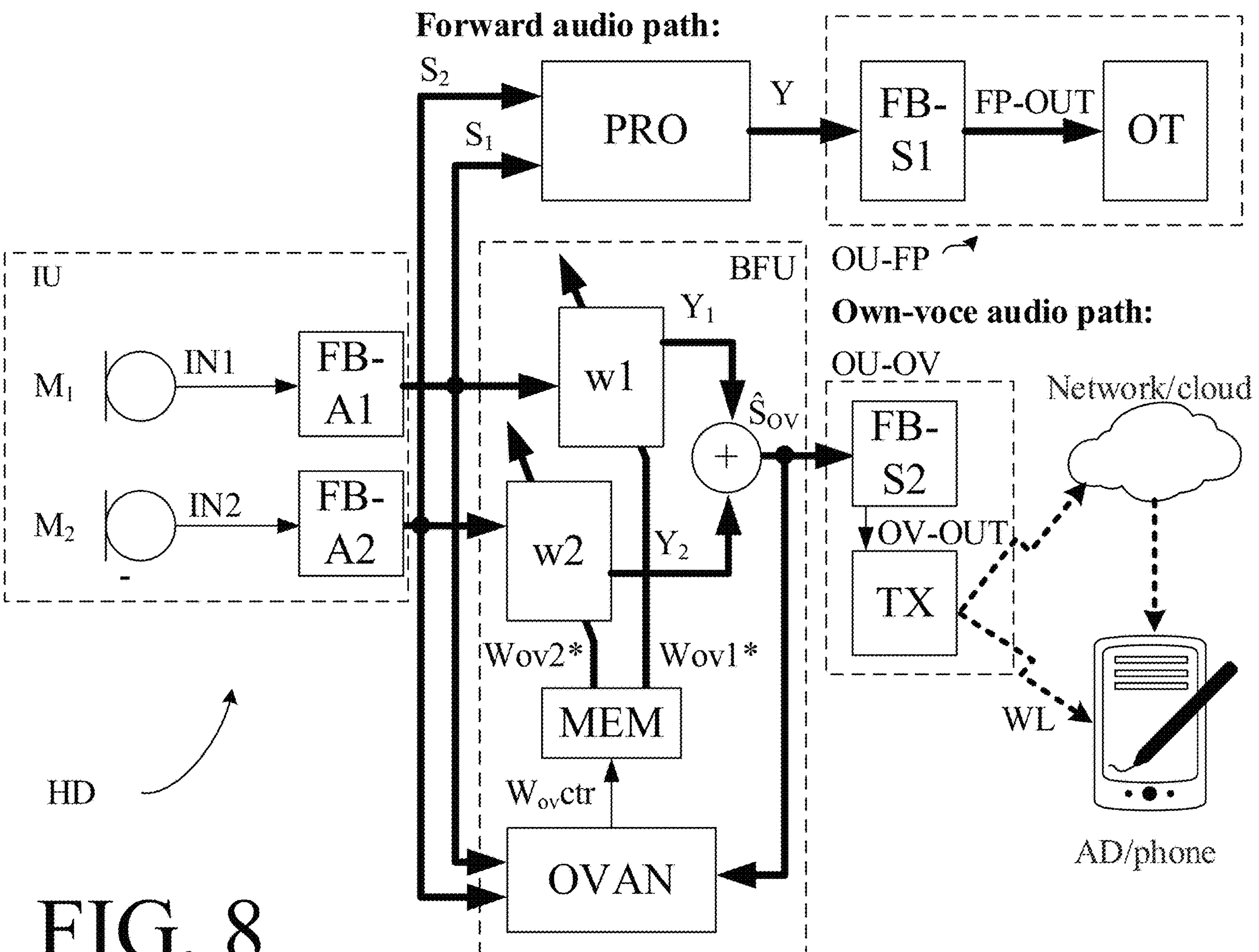
FIG. 8 shows a hearing device according to the present disclosure.

A broader solution would be simply to adapt the weights applied to each microphone signal directly. This is illustrated in FIG. 8.

Furthermore, the equations below are only valid for two microphones. But three microphones may also be relevant, e.g. in a configuration comprising one (inward-facing) ITE input transducer (e.g. a vibration sensor) and at least two outward-facing BTE input transducers (e.g. microphones), see e.g. FIG. 1A, or in a configuration comprising three ITE-input transducers (one inward-facing and two outward-facing).

Different ways of implementing the OV beamformer can be envisioned:

The own voice beamformer may e.g. be implemented as an MVDR beamformer with adaptive steering vector depending on the type of utterance (voiced, unvoiced, nasal . . . ).

The MVDR beamformer may e.g. be implemented as a generalized sidelobe canceller (GSC).

Figure 5:
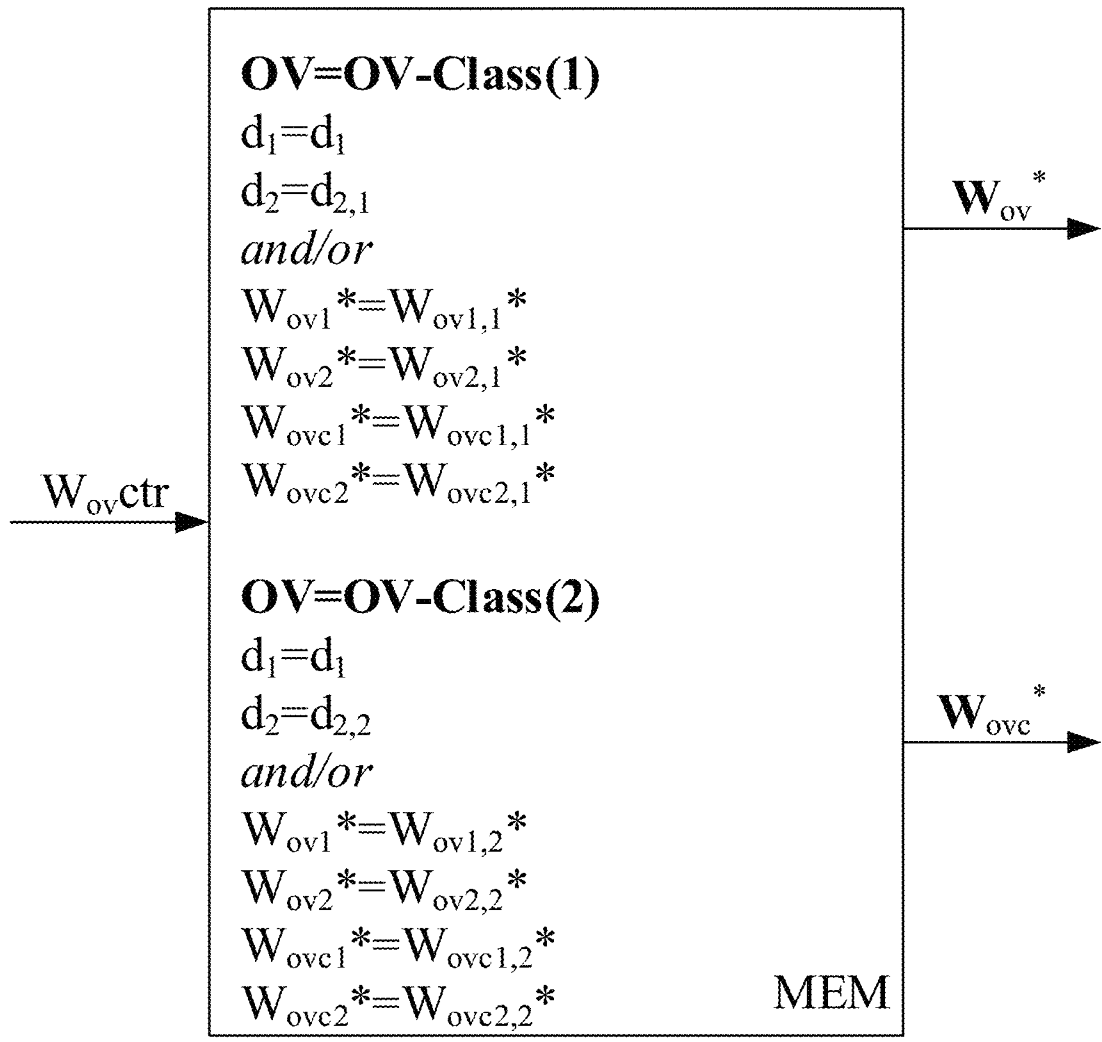
FIG. 5 shows an embodiment of the contents of a memory comprising (at east) two sets of parameters for controlling the beamformer filtering unit of FIG. 2A, 2B in dependence of a beamformer weight control signal.

The steering vector may be selected from a set of fixed steering vectors, each representing a specific voice-dependent transfer function between the ITE microphone and the BTE microphone(s), cf. e.g. FIG. 5. The resulting beamformer may be based on a single own voice beamformer at a given time and frequency or it may be based on a weighted sum between different own voice beamformers, where the weights e.g. are based on the probabilities for a given type of voice (e.g. derived based on a maximum-likelihood scheme).

Alternatively, the OV-beamformer may be implemented as a generalized eigenvector (GEV)-based beamformer, where the weights are adapted such that the ratio between own voice and (ambient) noise is maximized in a GEV beamformer, the own voice covariance matrix is assumed to have full rank (as it is spanned by the outer product of different steering vectors (look vectors)).

The beamformer filtering unit (BFU) is e.g. typically adapted to work optimally in situations where the microphone signals consist of a point-noise target sound source in the presence of additive noise sources. Given this situation, the adaptively determined scaling factor $\beta_{OV}$ (k) (cf. FIG. 2A, 2B) is adapted to minimize the noise under the constraint that the sound impinging from the target direction (at least at one frequency) is essentially unchanged. For each frequency band k, the adaptation factor $\beta_{OV}(k)$ can be found in different ways. The solution may be found in closed form as $$\beta_{OV}(k) = \frac{\langle C^* O \rangle}{\langle |C|^2 \rangle},$$

where * denotes the complex conjugation, and $\langle \cdot \rangle$ denotes the statistical expectation operator, which may be approximated in an implementation as a time average. The expectation operator $\langle \cdot \rangle$ may be implemented using e.g. a first order IIR filter, possibly with different attack and release time constants. Alternatively, the expectation operator may be implemented using an FIR filter.

The adaptive beamformer (ABF) may (alternatively) be configured to determine the adaptation parameter $\beta_{OV}(k)$ from the following expression $$\beta_{OV} = \frac{w_O^H C_v w_C}{w_C^H C_v w_C},$$

where $w_O$ and $w_C$ are the beamformer weights for the delay and sum O and the delay and subtract C beamformers, respectively, and $C_v$ is the (inter microphone) noise covariance matrix.

For a given frequency band k, let $h_{\theta_0}$ (k) denote a 2×1 complex-valued vector of acoustic transfer functions from a sound source located in direction (or location) $\theta_0$ to each input transducer (e.g. microphones or vibration sensors, e.g. denoted $M_1$, $M_2$). In the following the frequency band index k and direction (or location) $\theta_0$ is omitted, and the acoustic transfer function is simply written as $h \equiv h_{\theta_0}(k)$. Let us first define a normalized look vector (or steering vector) d as $$d = [\, d_1 \quad d_2 \,]^T = \frac{h}{\sqrt{h^H h}}$$

where $d_1$ and $d_2$ are the normalized (i.e. $|d|=1$) acoustic transfer functions from the sound source to the respective input transducers ($M_1$, $M_2$).

In an MVDR beamformer, a reference input transducer is selected. The reference input provides the reference electric input signal. The (target signal component of the) reference input signal is kept unaltered (distortionless) by the MVDR beamformer. A fixed filter may be applied to the output of the beamformer. Preferably, the (or one of the outward-facing) input transducers (e.g. BTE microphones) is selected as reference input transducer (e.g. microphone). The selection of reference input transducer (e.g. microphone) may e.g. be frequency dependent (in the sense that the reference input transducer may be different at different frequencies).

The omnidirectional beamformer O is achieved by applying possibly complex weights (or filter coefficients, w) to each of the electric input signals ($S_1$, $S_2$) from the input transducers. 'Omnidirectional' beamformer weights $wo=[wo_1\ wo_2]^T$ are calculated as $$wo = d d_{ref}^*,$$

where $d_{ref}^*$ is a complex-valued scalar corresponding to a spatial reference position. For simplicity, we choose the spatial reference position as the position of the first microphone, i.e. $d_{ref}^* = d_1^*$ such that $wo = dd_1^*$.

Like the omnidirectional beamformer O, the delay-and-subtract beamformer C is achieved by applying possibly complex weights (or filter coefficients) to each of the electric input signals ($S_1$, $S_2$) from the input transducers. The delay-and-subtract beamformer C is selected as a target cancelling beamformer, and its corresponding weights $wc=[wc_1\ wc_2]^T$ are found as described in [Jensen & Pedersen; 2015]

$$wc = \begin{bmatrix} 1 \\ 0 \end{bmatrix} - d d_1^*.$$

During detection of the user's own voice, the hearing device may be configured to adapt or to change the relative transfer function between the mouth of the user and the inward-facing (e.g. ITE) input transducer, which is used for designing beamformers (e.g. the beamformer weights). For example, the hearing device may be configured to adapt or change between at least two (relative) own-voice transfer functions, or similar parameters (e.g. beamformer weights) controlling the combination of the microphone signals (cf. e.g. FIG. 5).

The weights of the delay and sum (O) and delay and subtract (C) beamformers of the above expression for $\beta_{OV}$ (k) are adaptive because different acoustic transfer functions from mouth to microphones are applied in dependence of the 'content' (classification) of the current own voice signal. The $\beta_{OV}$-value may be adapted in dependence on the weights (w) and depending on the noise (or depending on the target signal).

The adaptation between the different parameters may be controlled by the content of the utterance, e.g. controlled depending on whether a specific speech component is transmitted through the skull. This choice may be made based on, for example, the energy, the degree of voicing, e.g., unvoiced or voiced, the fundamental frequency (pitch content), the spectral tilt, the spectral centroid, the spectral flatness, or other features describing the own voice speech signal. In other embodiments, the own voice signal is analyzed using more advanced signal processing/classification methods, e.g., based on deep neural networks, e.g., for classifying (as a function of time) the own-voice speech signal into a number of pre-specified signal classes. The selection of transfer function may vary across both time and frequency.

In another embodiment the detection between voiced or unvoiced speech and or the selection of parameters is depending on the difference between the utterance picked up by the inward-facing microphone and the outward-facing microphone.

In an embodiment the selection of parameters is based on a neural network trained to select the optimal relative transfer function (among a set of candidates), given the inward-facing and the outward-facing microphone signals.

In an embodiment, the inward-facing microphone is a movement sensor, such as an accelerometer. Preferably, an accelerometer for own voice detection or own voice pickup may have sample rate of at least 500 Hz, at least 1000 Hz, at least 2000 Hz or at least 4000 Hz.

Figure 3A:
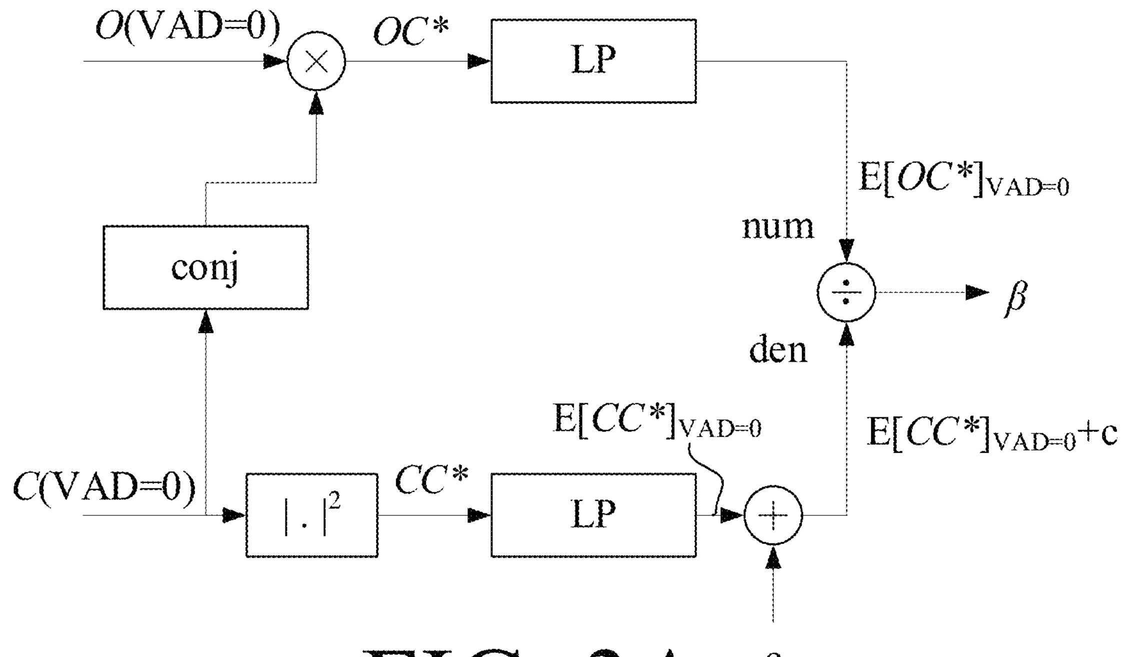
FIG. 3A shows an exemplary block diagram illustrating how the adaptative parameter $\beta_{OV}$ of FIG. 2A, 2B may be determined when the electric input signals comprise no speech.
Figure 3B:
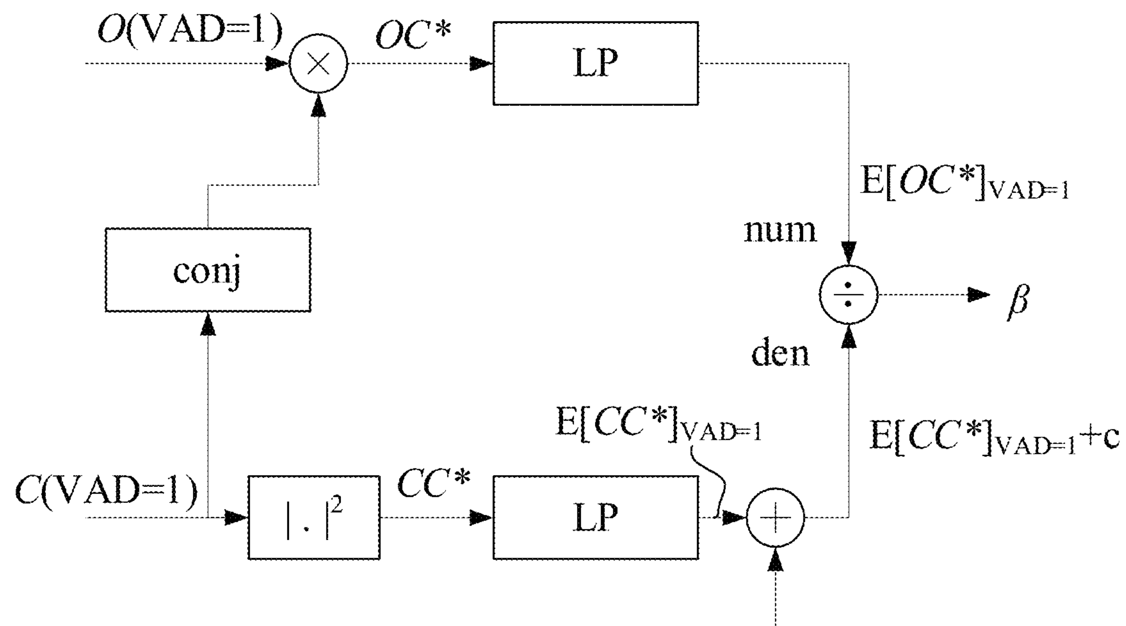
FIG. 3B shows an exemplary block diagram illustrating how the adaptative parameter $\beta_{OV}$ of FIG. 2A, 2B may be determined when the electric input signals comprise speech.

FIG. 3A and FIG. 3B shows a block diagram illustrating how the parameter $\beta_{OV}$ of FIG. 2A, 2B may be determined when the electric input signals comprise no speech and speech, respectively (VAD=0, VAD=1). In the expression for $\beta_{OV}$ the numerator contains the average value of C*O and in the denominator contains the average value of C*C ($=|C|^2$). We obtain the average value by low-pass filtering the two terms. As C*O typically is complex-numbered, we low-pass filter the real and the imaginary part of C*O separately. In an embodiment, we low-pass filter the magnitude and the phase of C*O separately. The resulting adaptation factor $\beta_{OV}$ may be determined from input beam former signals O and C by appropriate functional units implementing the algebraic functions of the expression for $\beta_{OV}$, i.e. complex conjugation unit ('conj') providing C* from input C, multiplication unit ('x') providing complex product O·C* from inputs O and C *. Magnitude squared unit ('$|\cdot|^2$') provides magnitude squared $|C|^2$ of input C. Complex and real valued sub-band signals O·C* and $|C|^2$, respectively, are low pass filtered by low pass filtering units LP to provide the resulting numerator ('num') and denominator ('den') in the expression for $\beta_{OV}$ (the constant c being added to the real value of $|C|^2$ by summation unit '+' before or after the LP-filter (here after) to provide the expression for the denominator. The resulting adaptation factor $\beta_{OV}$ is provided by division unit ('•/•') based on inputs 'num' (numerator) and 'den' (denominator) equal to expectation values (time averages) $E[OC^*]_{OVAD=n}$, and $E[CC^*]_{OVAD=n}$+c, respectively, where n=0 (no own voice present) is represented by FIG. 3A and n=1 (own voice present) is represented by FIG. 3B. The constant c may be equal to zero, or different from zero.

Figure 4:
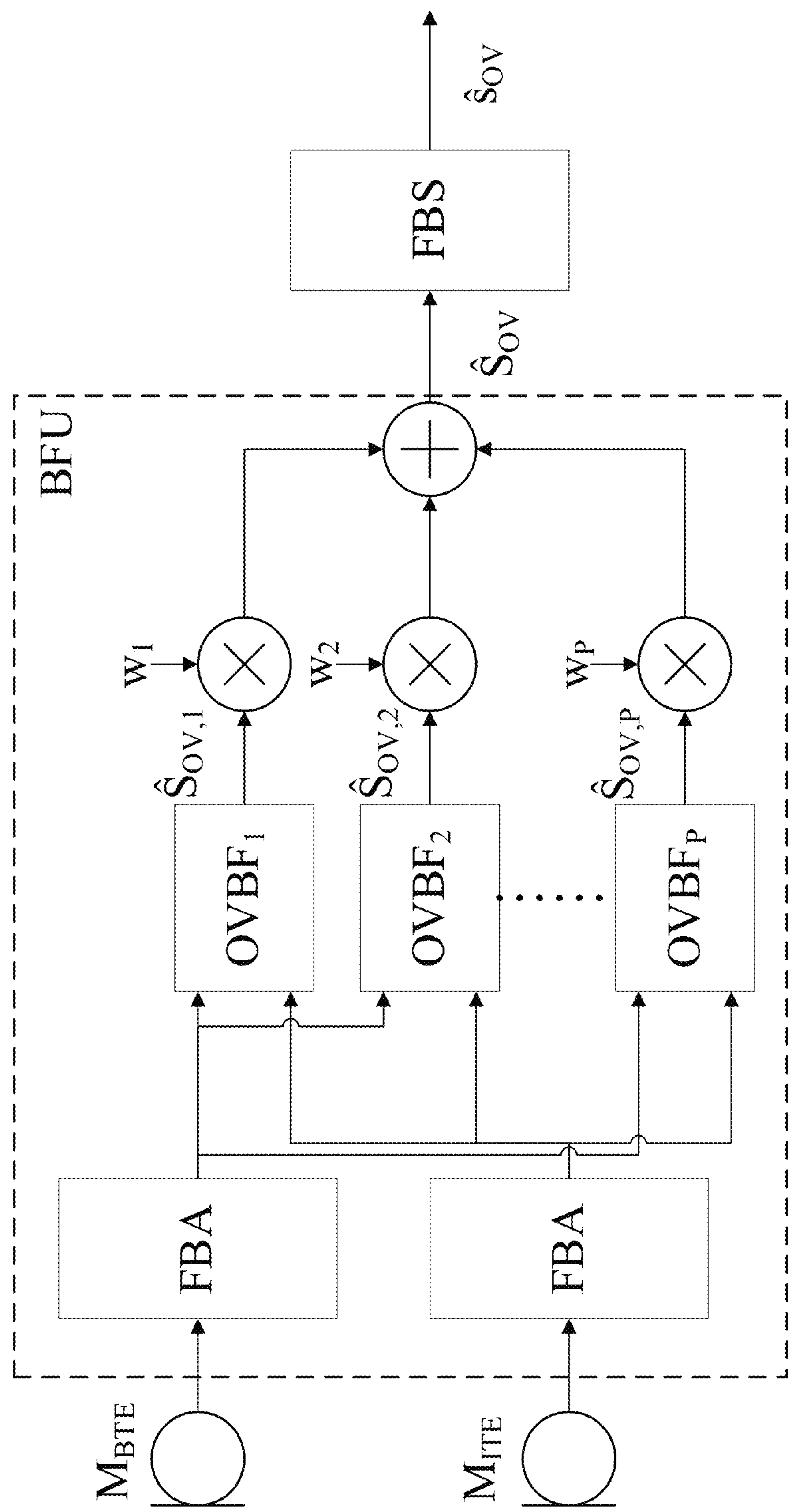
FIG. 4 shows an example of an adaptive beamformer filtering unit for providing a beamformed signal comprising the user's own voice implemented by multiple parallel own voice beamformers each weighted by a factor w.

FIG. 4 shows an example of an adaptive beamformer filtering unit (BFU) for providing a beamformed signal ($\hat{S}_{OV}$) comprising the user's own voice implemented by multiple (P) parallel own voice beamformers ($OVBF_p$, p=1, 2, . . . , P) each weighted by a factor $w_p$. Each own voice beamformer ($OVBF_p$) is calibrated towards enhancing a certain part of the user's voice, depending on its origin. One own voice beamformer may be adapted towards enhancing nasal sounds. Another own voice beamformer may be adapted towards enhancing fricatives. Each own voice beamformer may be implemented as a generalized sidelobe canceller structure containing different own voice cancelling beamformers. In the case of voiced speech, the majority of the weight (e.g. more than 60%, such as more than 80%) is applied to the beamformer which enhances voiced speech. In an embodiment, the sum of the beamformer weights $w_1, \ldots, w_p$ equals 1. Hereby the weights ($w_p$) may correspond to a probability of a given part of the own voice, e.g. the probability of a given phoneme. The weighted outputs ($w_p\hat{S}_{OV,p}$, p=1, 2, . . . , P) are combined in combination (here summation) unit ('+') to provide the (resulting) beamformed signal ($\hat{S}_{OV}$). A synthesis filter bank (FBS) converts the beamformed signal ($\hat{S}_{OV}$) comprising the estimate of the user's own voice in the frequency domain (as frequency sub-band signals ($\hat{S}_{OV}$)) to a time-domain signal ($\hat{s}_{OV}$).

In another embodiment, the own voice beamformers (and own voice cancelling beamformers) are used as input to a maximum likelihood function, in order to detect the type of the current own voice sound (e.g. voiced or unvoiced), cf. e.g. US20180359572A1.

FIG. 5 shows an embodiment of the contents of a memory comprising (at east) two sets of parameters for controlling the beamformer filtering unit of FIG. 2A, 2B in dependence of a beamformer weight control signal.

Figure 6:
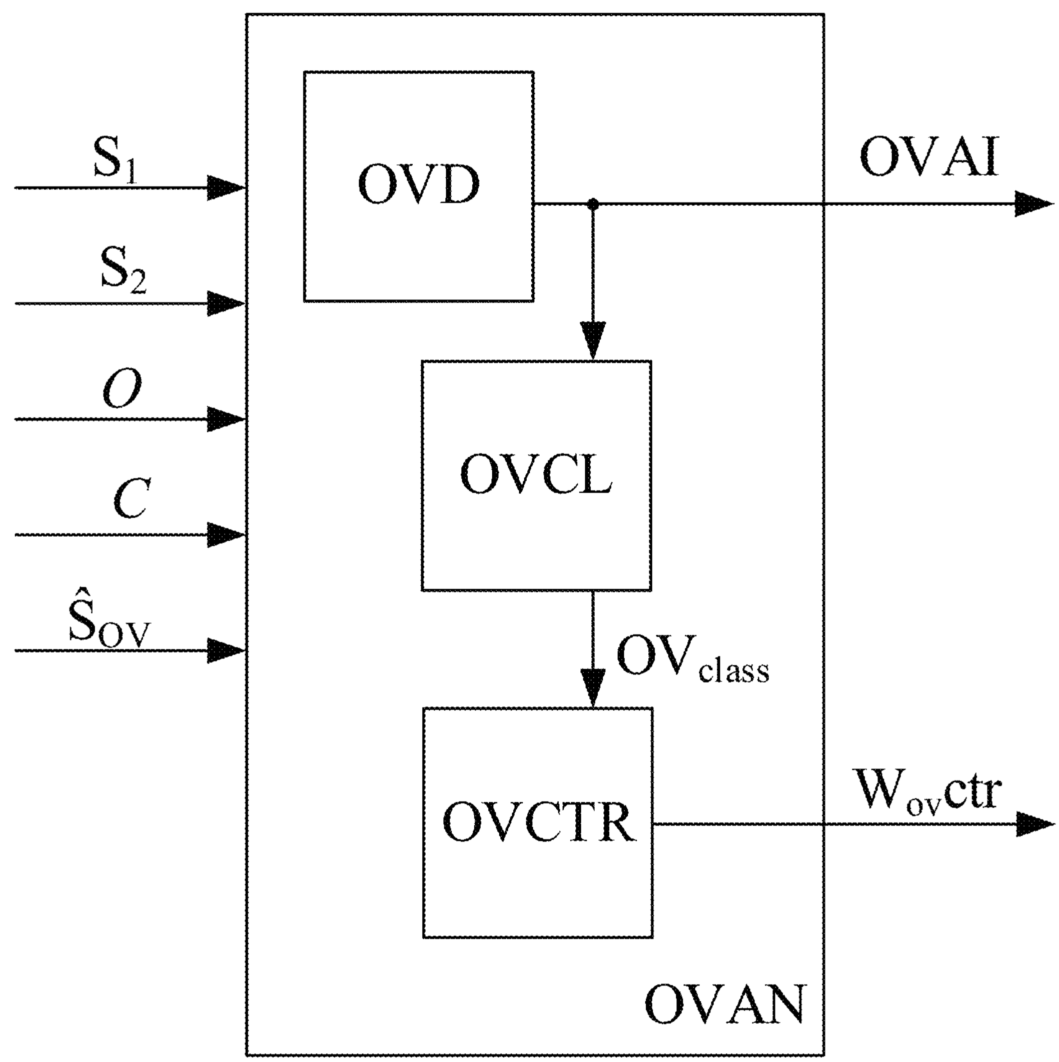
FIG. 6 shows an embodiment of an own voice analyzer according to the present disclosure.

The memory (e.g. memory parts, denoted MEM' in FIG. 2B) may store beamformer parameters (acoustic transfer functions d, or beamformer weights W) associated with a given own voice classification (OV-Class(q), q=1, . . . , Q, where Q is the number of classes provided by the own voice classifier (OVCL, cf. FIG. 6). Here the number of classes is two (Q=2).

OV-Class(1);

Beamformer parameters for the first own voice class (OC) OV=OV-Class(1) are:

Acoustic transfer functions d:

$d_1=d_1$, acoustic transfer function for input transducer 1 (e.g. $M_{BTE}$ in FIG. 2B)

$d_2=d_{2,1}$, acoustic transfer function for input transducer 2 (e.g. $M_{ITE}$ in FIG. 2B) and/or Beamformer weights W (based on acoustic transfer functions $d=(d_1, d_{2,1})^T$) for the target maintaining and target-cancelling beamformers:

$$W_{ov1}^{*} = W_{ov1,1}^{*}$$

$$W_{ov2}^{*} = W_{ov2,1}^{*}$$

$$W_{ovc1}^{*} = W_{ovc1,1}^{*}$$

$$W_{ovc2}^{*} = W_{ovc2,1}^{*}$$

OV-Class(2):

Beamformer parameters for the first own voice class (OC) OV=OV-Class(2) are:

Acoustic transfer functions d:

$d_1=d_1$, acoustic transfer function for input transducer 1 (e.g. $M_{BTE}$ in FIG. 2B)

$d_2=d_{2,2}$, acoustic transfer function for input transducer 2 (e.g. $M_{ITE}$ in FIG. 2B) and/or Beamformer weights W (based on acoustic transfer functions $d=(d_1, d_{2,2})^T$) for the target maintaining and target-cancelling beamformers:

$$W_{ov1}^{*} = W_{ov1,2}^{*}$$

$$W_{ov2}^{*} = W_{ov2,2}^{*}$$

$$W_{ovc1}^{*} = W_{ovc1,2}^{*}$$

$$W_{ovc2}^{*} = W_{ovc2,2}^{*}$$

The own voice controller (cf. OVCTR in FIG. 6) is—based on the own voice beamformer weight control signal ($W_{OV}$ctr)-configured to read the acoustic transfer functions d and/or the beamformer weights W associated with a current own voice class (OV-Class(q)) determined by the own voice classifier (OVCL in FIG. 6, e.g. forming part of the own voice analyzer (OVAN) in FIG. 2B, and further described in connection with FIG. 6) and to apply the relevant parameters to the own voice beamformer (overriding the previously applied, beamformer parameters), cf. e.g. FIG. 4.

Instead of containing beamformer weights (W) for the target maintaining ($W_{ov1}$*, $W_{ov2}$*) and target-cancelling ($W_{ovc1}$*, $W_{ovc2}$*) beamformers, respectively, the memory (MEM) may contain resulting weights (Wov1*, Wov2*) to be applied to the (first and second) input signals ($S_1$, $S_2$), cf. e.g. FIG. 6.

FIG. 6 shows an embodiment of an own voice analyzer according to the present disclosure.

The hearing device comprises an own voice analyzer (OVAN) configured to analyze at least one of the first electric input signal ($S_1$) and the at least one second electric input signal ($S_2$), or to analyze a signal or signals originating therefrom, and to provide an own voice beamformer weight control signal $W_{OV}$ctr). The own voice analyzer (OVAN) comprises an own voice detector (OVAD) configured to estimate whether or not, or with what probability, a given input signal (($S_1$, $S_2$, O, C, $\hat{S}_{OV}$) representative of sound originates from the voice of the user of the system (hearing device (HD)), and to provide an own voice control signal (OVAI) indicative thereof. The own voice control signal (OVAI) may be used to control other parts of the system, e.g. to switch between an own voice beamformer and an environment oriented beamformer or to control or influence the adaptive beamformer providing the parameter $\beta_{OV}$. The own voice analyzer (OVAN) further comprises an own voice classifier (OVCL) configured to classify, in dependence of the own voice control signal (OVAI), an utterance from the user in at least two classes (OV-Class(1), OV-Class(2), see e.g. FIG. 5) and to provide an own voice classification signal ($OV_{class}$) indicative thereof. For example, the own voice classifier (OVCL) can be configured to classify, in dependence of the own voice control signal (OVAI) and the given input signal, an utterance from the user in at least two classes (OV-Class(1), OV-Class(2), see e.g. FIG. 5) and to provide the own voice classification signal ($OV_{class}$) indicative thereof. The own voice analyzer (OVAN) further comprises an own voice beamformer controller (OVCTR) configured to control the configurable own voice beamformer weights (W) in dependence of the own voice classification signal ($OV_{class}$), and to provide the own voice beamformer weight control signal ($W_{OV}$ctr). The own voice beamformer weight control signal ($W_{OV}$ctr) is used to select from memory (MEM) (cf. e.g. FIG. 5, and MEM in 2B) and apply current weights ($W_{ovi}$*, $W_{ovci}$*, i=1, 2) to the own voice beamformer (cf. e.g. BFU in FIG. 2B) according to the current classification of the user's own voice ($\hat{S}_{OV}$) (cf. signal $OV_{class}$).

The own voice classifier (OVCL) may e.g. be configured to classify the type of own voice depending on

- the estimated transfer function between an inward-facing input transducer (located in an ITE-part) and an outward-facing input transducer) (e.g. a microphone located in a BTE-part or in an ITE-part of the hearing device) (This may also be useful to classify whether or not the utterance is own voice), or
- the content of the own voice signal (e.g. whether it is voiced or unvoiced)

The own voice classifier (OVCL) may e.g. be configured to classify (as a function of time) an own-voice speech signal (see e.g. $\hat{S}_{OV}$ in FIG. 2A, 2B, 4, 6, 8) into a number (e.g. two or more) of pre-specified signal classes ($OV_{class}$). Alternatively or additionally, the own voice classification signal (OV class) may be based on one or more of the electric input signals (e.g. on the second electric input signal ($S_2$) originating from the second, inward-facing, input transducer ($M_2$, $M_{ITE}$)). The own voice classification signal ($OV_{class}$) may be frequency dependent.

The own voice classifier (OVCL) may be configured to provide the own voice classification signal ($OV_{class}$) in dependence of one or more of the energy of the signal, the degree of voicing, e.g., unvoiced or voiced, a fundamental frequency, e.g. pitch content, a spectral tilt, a spectral centroid, or a spectral flatness of the own voice signal. The content of the utterance may be characterized by features describing the own voice speech signal. For example, the own voice control signal (OVAI) may be indicative of one or more of: the energy of the signal, the degree of voicing, e.g., unvoiced or voiced, a fundamental frequency, e.g. pitch content, a spectral tilt, a spectral centroid, or a spectral flatness of the own voice signal.

The own voice classifier (OVCL) may be configured to provide the own voice classification signal ($OV_{class}$) in dependence of a difference between the utterance picked up by the inward-facing microphone ($M_2$, $M_{ITE}$) and the outward-facing microphone(s) ($M_1$, $M_{BTE}$), e.g. a difference in input level or a difference in power spectral density of the corresponding electric input signals ($S_2$, $S_1$). For example, the own voice control signal (OVAI) may be indicative of the difference between the utterance picked up by the inward-facing microphone ($M_2$, $M_{ITE}$) and the outward-facing microphone(s) ($M_1$, $M_{BTE}$).

The own voice classifier (OVCL) may e.g. be configured to provide the own voice classification signal ($OV_{class}$) in dependence of whether or not, or to which degree, a specific speech component is transmitted through the skull. For example, the own voice control signal (OVAI) may be indicative of whether or not, or to which degree, a specific speech component is transmitted through the skull. Vowel- (and some consonant-) sounds of a speech utterance are e.g. to a higher degree transferred via the skull than unvoiced parts (e.g. some consonant sounds, e.g. /t/, /p/, /k/) of an utterance. By analyzing the content of the own voice signal, this may be detected either from the content of the own voice signals or from the transfer function between the inward-facing (ITE-) microphone ($M_2$, $M_{ITE}$) and the outward-facing (BTE-) microphone(s) ($M_1$, $M_{BTE}$). By visually inspecting a spectrogram (i.e. the audio signal as function of time and frequency), or using an algorithm, e.g. based on a neural network, voiced and unvoiced sounds are easy to localize (the detection of e.g. pitch would indicate a voiced sound). It may be advantageous to classify unvoiced sounds as own voice based on the transfer function between two outward-facing (BTE-) microphones, as there may be no or little unvoiced sound available at the inward-facing (ITE-) microphone, and we still have to determine if the unvoiced content origins from the user or from another person.

The own voice classifier (OVCL) may be implemented as a neural network, e.g. pretrained with recordings of an ITE- and BTE-microphone signals labelled according to the classes (OV-Class(n).

Figure 7B:
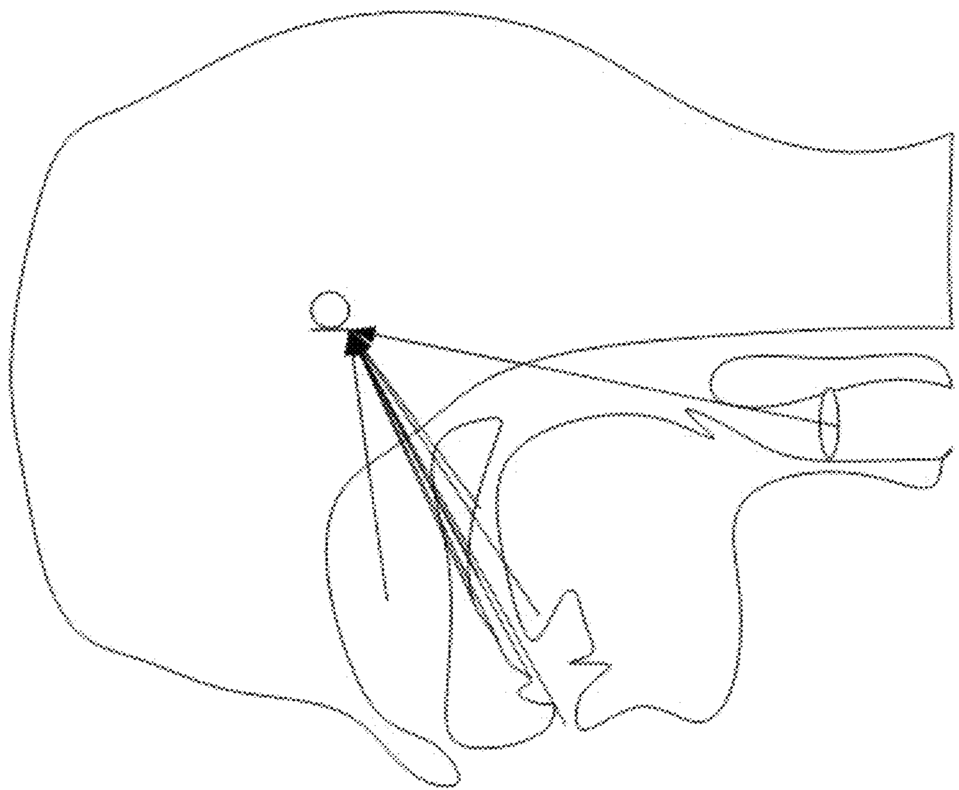
FIG. 7A shows the various elements of the human speech production organ, FIG. 7B schematically shows the acoustic propagation paths from the individual organs to the human ear.
Figure 7A:
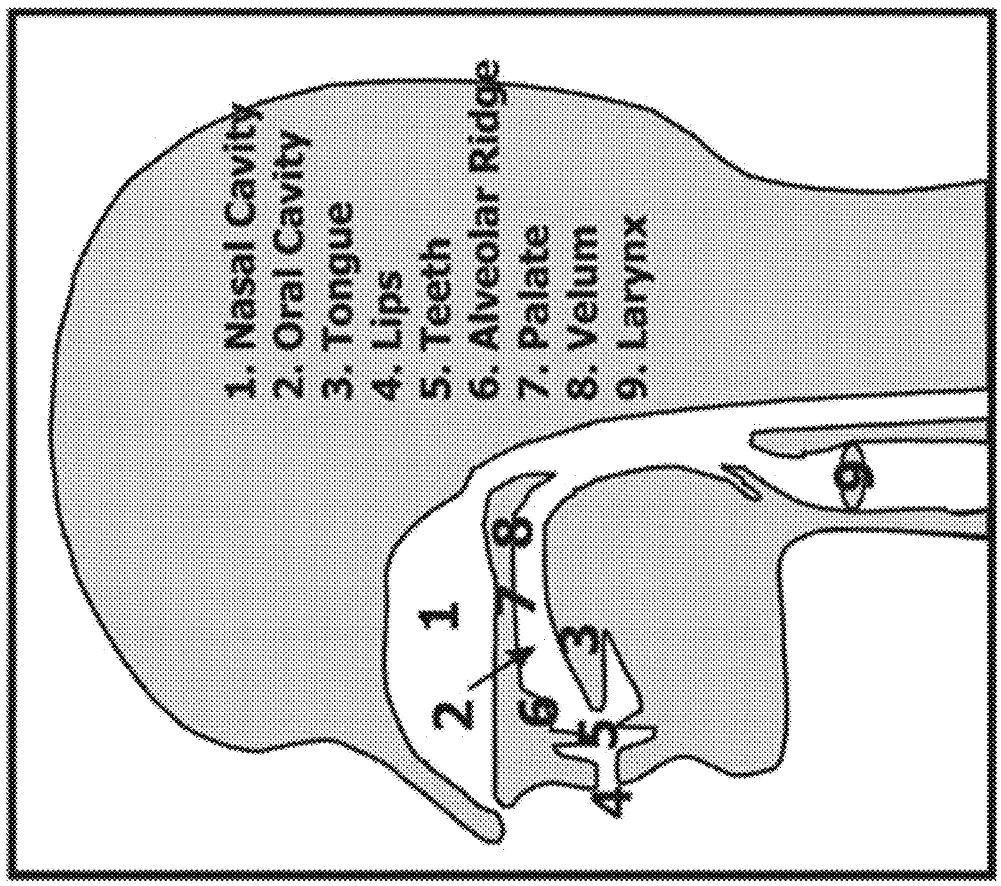

FIG. 7A shows the various elements of the human speech production organ:

1. nasal cavity,
2. oral cavity,
3. tongue,
4. lips.
5. teeth,
6. alveolar ridge,
7. palate,
8. velum,
9. Larynx (including vocal folds).

FIG. 7B schematically shows the acoustic propagation paths from the individual speech organ (illustrated in FIG. 7A) to the human ear (e.g. to an inward-facing input transducer (e.g. a microphone or a vibration sensor, such as an accelerometer). As illustrated in FIG. 7B, sound propagated from the human speech production organ to an (e.g. inward-facing) input transducer located in an ear canal of the user may be described as a sum of speech-relevant sounds, each having their own transfer function. And the combined own voice sound may thus not be well described as a single point source, solely originating from the mouth.

When own voice is transmitted (propagated) from the mouth to an outward-facing input transducer, the source of the user's own voice can be regarded as a point source and it can be assumed that the own voice is propagated from the mouth, along the head, where it reaches the outward-facing input transducer(s). In that case, the own voice source signal picked up by the (outward-facing) input transducer(s) can be characterized by a fixed transfer function, independent of from where in the speech production organ the voice origins.

However, when own voice is propagated from the mouth to an inward-facing input transducer, the source of the user's own voice should not be regarded as a single source. It can be represented by a combination of different transfer functions depending on where in the speech production organ, the sound is generated. Voiced sounds, like vowels and nasal sounds, is to a higher degree passed via the skull compared to non-voiced sounds, like fricatives. Fricatives may e.g. be characterized as consonant sounds generated by an airflow through a narrow channel, e.g. between the lower lip and the upper teeth.

FIG. 8 shows a hearing device according to the present disclosure. FIG. 8 shows a hearing device (HD), e.g. a hearing aid or a headset or earphone, configured to be worn at or in an ear of the user. The hearing device comprises at least one first, outward-facing, input transducer ($M_1$) configured to pick up first sounds from the environment of the user and to provide respective first electric input signals ($S_1$) representative of the first sounds. The hearing device (HD) further comprises a second, inward-facing, input transducer ($M_2$) configured to pick up second sounds at (or near) the eardrum of the user and to provide a second electric input signal ($S_2$) representative of the second sounds. The hearing device further comprises a directional system configured to receive the at least one first and the second electric input signals ($S_1$, $S_2$). The directional system comprises an own voice beamformer (BFU) configured to provide an estimate of the user's own voice ($\hat{S}_{OV}$) in dependence of the first and the at least one second electric input signals ($S_1$, $S_2$) and configurable own voice beamformer weights ($W_{OV}$).

The hearing device (HD) may comprise a transform unit for converting a time domain signal to a signal in the transform domain, e.g. the (time-)frequency domain. The transform unit may e.g. be constituted by or comprise a TF-conversion unit (cf. FB-A1, FB-A2, located in the input unit (IU) in FIG. 8) for providing a time-frequency representation of an input signal. The time-frequency representation may comprise an array or map of corresponding complex or real values of the signal in question in a particular time and frequency range. The TF conversion unit may comprise a filter bank for filtering a (time varying) input signal and providing a number of (time varying) output signals each comprising a distinct frequency range of the input signal. Each of the input transducer paths may comprise a TF-conversion unit, e.g. an analysis filter bank (FBA). Thereby the processing of the (first and second) electric input signals in the frequency sub-band domain is enabled.

The hearing device (HD) further comprises a forward audio path (cf. 'Forward audio path:' in FIG. 8) from the input unit (IU) to the (first) output unit (OU-FP). The forward audio path comprises a processor (PRO) for applying on e or more processing algorithms to the electric input signals ($S_1$, $S_2$), or to a signal or signals originating therefrom, and to provide a processed signal (Y), which is fed to the output unit (OU-FP). The hearing device (here the (first) output unit (OU-FP)) further comprises a first synthesis filter bank (FB-S1) configured to convert a signal (here processed signal (Y)) in the time-frequency domain to a signal (FP-OUT) in the time-domain. The hearing device (HD) (here the output unit (OU-FP)) further comprises an output transducer (e.g. a loudspeaker) (OT) configured to play sound directed towards the eardrum of the user. The output sound may be based on the electric input signals ($S_1$, $S_2$) of the first and second input transducers ($M_1$, $M_2$) and hence comprise sounds from the environment of the user (possibly mixed with (e.g. an attenuated version) the user's own voice). The output sound may, however, also be based on a (possibly wirelessly) received signal from another device or system, e.g. a signal from a far-end talker of a telephone conversation between the user and the far-end talker (as in a specific telephone mode of a hearing aid or in a normal headset application). The far-end sound may be mixed into the forward-path, e.g. via the processor (PRO) and hence be mixed with a (possibly) attenuated version of the environment sound (e.g. including the user's own voice, 'sidetone').

The hearing device (HD) further comprises an own-voice audio path (cf. 'Own-voice audio path:' in FIG. 8) from the input unit (IU) to the (second) output unit (OU-FP). The own-voice audio path comprises the own voice beamformer (BFU). The estimate of the user's own voice ($\hat{S}_{OV}$) provided by the own voice beamformer (BFU) is fed to the output unit (OU-OV). The hearing device (HD) (here the output unit (OU-OV) comprises a transmitter (TX) for transmitting the own voice estimate ($\hat{S}_{OV}$) to another device or system (AD/Phone), e.g. to a telephone or other auxiliary device (e.g. an, optionally handheld, processing device, for further use or processing of the own voice estimate. The transmission to another device or system (AD/Phone) may e.g. be via a direct wireless link (WL) to a phone (cf. 'telephone mode' or 'headset mode', referred to above) or other accessory device related to the hearing device, and/or via another communication means to a server on a network (cf. 'Network/cloud' (and further optional connection to the auxiliary device (AD/phone) in FIG. 8). The direct wireless link (WL) may e.g. be based on Bluetooth (e.g. Bluetooth LE, e.g. LE Audio).

The hearing device (HD), here the own-voice beamformer (BFU), further comprises an own voice analyzer (OVAN) (see e.g. FIG. 6) configured to analyze at least one of said at least one first ($S_1$) and the second electric input signals ($S_2$), or to analyze a signal or signals (O; C; $\hat{S}_{OV}$) originating therefrom, and to provide an own voice beamformer weight control signal ($W_{ov}$ctr). The own voice analyzer (OVAN) comprises an own voice detector (OVAD) configured to estimate whether or not, or with what probability, a given input signal representative of sound originates from the voice of the user of the system, and to provide an own voice control signal (OVAI) indicative thereof. The own voice analyzer (OVAN) further comprises an own voice classifier (OVCL) configured to classify, in dependence of the own voice control signal (OVAI), an utterance from the user in at least two classes and to provide an own voice classification signal ($OV_{class}$). For example, the own voice classifier (OVCL) can be configured to classify, in dependence of the own voice control signal (OVAI) and the at least one of said first ($S_1$) and the second electric input signals ($S_2$), or a signal or signals (O; C; $\hat{S}_{OV}$) originating therefrom, an utterance from the user in at least two classes and to provide an own voice classification signal ($OV_{class}$). The own voice analyzer (OVAN) further comprises an own voice beamformer controller (OVCTR) configured to control the configurable own voice beamformer weights ($W_{ovi}$*, $W_{ovci}$*, i=1, . . . , M, M being the number of input transducers, see e.g. FIG. 2A, 2B, where M=2) in dependence of the own voice classification signal ($OV_{class}$), and to provide the own voice beamformer weight control signal ($W_{ov}$ctr).

The own voice beamformer controller (OVCTR) may be configured to determine or select a current steering vector (d) (see e.g. FIG. 5) in dependence of the own voice classification signal ($OV_{class}$) (or the own voice beamformer weight control signal ($W_{ov}$ctr)) and to determine (or provide) the configurable own voice beamformer weights ($W_{ovi}$*, $W_{ovci}$*) in dependence thereon. The appropriate own voice beamformer weights ($W_{ovi}$*, $W_{ovci}$*) may be selected from different sets of beamformer weights (or steering vectors) stored in memory (MEM) of the hearing device (HD), here of the own-voice beamformer (BFU), for different own voice classes in dependence of the current value of the own voice classification signal ($OV_{class}$).

The inward-facing, input transducer ($M_{ITE}$) may e.g. be constituted by (or comprise) a vibration sensor (e.g. an accelerometer). The accelerometer preferably has a sample rate of at least 500 Hz. The inward-facing, input transducer ($M_{ITE}$) may e.g. be constituted by (or comprise) a microphone, e.g. a MEMS microphone.

The hearing device (HD) may comprise an ITE-part adapted to be located at or in an ear canal of the user. The ITE-part may comprise the inward-facing input transducer ($M_2$; or $M_{ITE}$, see e.g. FIG. 1A, 1B, 2A, 2B). The hearing device (HD) may comprise a BTE-part adapted to be located at or behind an ear (pinna) of the user. The BTE-part may comprise the outward-facing input transducer(s) ($M_1$; or $M_{BTE}$, see e.g. FIG. 2A, 2B; or $M_{BTE1}$, $M_{BTE2}$, see e.g. FIG. 1A, 1B).

The ITE-part may comprise the output transducer of the forward audio path (see e.g. FIG. 1A, 1B). The output transducer may comprise a loudspeaker (SPK). The electric signal ($S_2$) of the inwards facing (ITE-) microphone ($M_2$; $M_{ITE}$) may be 'polluted' by the loudspeaker (SPK) sound, while own voice is present. The loudspeaker sound may hence, preferably, be subtracted from the recorded signal ($S_2$) of the inwards facing (ITE-) microphone ($M_2$; $M_{ITE}$) before the sound is analyzed (e.g. in the own voice analyzer (OVAN)). To that end, the hearing device (HD) preferably comprises a feedback control system (e.g. a feedback cancellation system) configured to attenuate or cancel the output signal from the speaker as picked up by the inwards facing (ITE-) microphone ($M_2$; $M_{ITE}$) (to thereby (ideally) provide a cleaner own voice signal). The subtraction may be made conditional of the presence of own voice (cf. e.g. own voice control signal (OVAI) in FIG. 6).

When own voice is transmitted (propagated) from the mouth to the at least one first, outward-facing, input transducer ($M_1$; $M_{BTE}$; $M_{BTE1}$, $M_{BTE2}$), (e.g. one or more outward-facing, 'external microphones', e.g. located in a BTE-part (or in an ITE-part) of the hearing device), the source of the user's own voice can be regarded as a point source and that the own voice to be propagated (in air) from the mouth, along the head, where it reaches the outward-facing input transducer(s). In that case, the own voice source signal can be characterized by (a) fixed transfer function(s), independent of from where in the speech production organ (the vocal fold, the nasal cavity or the teeth) the voice origins, cf. e.g. FIG. 7A.

However, the second, inward-facing input transducer (e.g. an in-ear canal microphone ($M_1$; $M_{ITE}$)) does not 'see' the voice of the user as a single source. It can be represented by a combination of different transfer functions depending on where in the speech production organ, the sound is generated, cf. e.g. FIG. 7A. Voiced sounds, like vowels and nasal sounds, are to a higher degree passed via the skull (bone conduction) compared to non-voiced sounds, like fricatives. Fricatives may e.g. be characterized as consonant sounds generated by an airflow through a narrow channel, e.g. between the lower lip and the upper teeth.

For that reason, the transfer function between the outward-facing and inward-facing microphones may rather be described as a sum of speech-relevant sounds, each having their own transfer function. And the combined own voice sound may thus not be well described as a single point source, solely originating from the mouth.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element, but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

REFERENCES

EP3883266A1 (Oticon) 22 Sep. 2021

WO2004077090A1 (Oticon) 10 Sep. 2004

EP3328097A1 (Oticon) 30 May 2018

EP3588981A1 (Oticon) 1 Jan. 2020

[Jensen & Pedersen; 2015] J. Jensen and M. S. Pedersen, "Analysis of Beamformer Directed Single-Channel Noise Reduction System for Hearing Aid Applications," Proc. Int. Conf. Acoust., Speech, Signal Processing, pp. 5728-5732, April 2015.

US2015304782A1 (Phonak) 22 Oct. 2015

US20180359572A1 (Oticon) 13 Dec. 2918

The invention claimed is:

1. A hearing device configured to be worn at or in an ear of the user, the hearing device comprising:

at least one first, outward-facing, input transducer configured to pick up first sounds from the environment of the user and to provide respective first electric input signals representative of said first sounds;

a second, inward-facing, input transducer configured to pick up a second sounds at the eardrum of the user and to provide a second electric input signal representative of said second sounds;

a directional system configured to receive said at least one first and said second electric input signals and comprising an own voice beamformer configured to provide an estimate of the user's own voice in dependence of said at least one first and said second electric input signals and configurable own voice beamformer weights;

an own voice analyzer configured to analyze at least one of said at least one first and said second electric input signals, or to analyze a signal or signals originating therefrom, and to provide an own voice beamformer weight control signal, the own voice analyzer comprising:

an own voice detector configured to estimate whether or not, or with what probability, a given input signal representative of sound originates from the voice of the user of the system, and to provide an own voice control signal indicative thereof;

an own voice classifier configured to classify, in dependence of the own voice control signal, an utterance from the user in at least two classes and to provide an own voice classification signal, and an own voice beamformer controller configured to control said configurable own voice beamformer weights in dependence of said own voice classification signal, and providing said own voice beamformer weight control signal.

2. A hearing device according to claim 1, wherein the own voice beamformer controller is configured to determine or select a current steering vector in dependence of the own voice classification signal and to determine the configurable own voice beamformer weights in dependence thereon.

3. A hearing device according to claim 1, the hearing device comprising an ITE-part adapted to be located at or fully or partially in an ear canal of the user, wherein said ITE-part comprises said second, inward-facing, input transducer.

4. A hearing device according to claim 1, wherein said second, inward-facing, input transducer comprises a vibration sensor.

5. A hearing device according to claim 1, wherein said second, inward-facing, input transducer comprises an accelerometer.

6. A hearing device according to claim 1, wherein the own voice classifier is configured to provide the own voice classification signal in dependence of the content of the utterance.

7. A hearing device according to claim 1, wherein the own voice classifier is configured to provide the own voice classification signal in dependence of whether or not, or to which degree, a specific speech component is transmitted through the skull.

8. A hearing device according to claim 1, wherein the own voice classifier is configured to provide the own voice classification signal in dependence of one or more of: the energy of the signal, the degree of voicing, e.g., unvoiced or voiced, a fundamental frequency, e.g. pitch content, a spectral tilt, a spectral centroid, and a spectral flatness.

9. A hearing device according to claim 1, wherein the own voice classifier is configured to provide the own voice classification signal in dependence of a difference between the utterance picked up by the inward-facing microphone and the outward-facing microphone, e.g. a difference in input level or a difference in power spectral density of the corresponding electric input signals.

10. A hearing device according to claim 1, wherein the own voice classifier is based on a learning algorithm, e.g. a neural network, such as a deep neural network.

11. A hearing device according to claim 1, the hearing aid comprising a transform unit for converting a time domain signal to a signal in the transform domain.

12. A hearing device according to claim 1, wherein the hearing device is configured to provide that the configuration of the own voice beamformer weights vary across time and frequency.

13. A hearing device according to claim 1, the hearing device comprising a BTE-part adapted to be located at or behind an ear of said user, and wherein at least one of said at least one first, outward-facing, input transducers is/are located.

14. A hearing device according to claim 1, the hearing device comprising antenna and transmitter circuitry allowing the estimate of the user's own voice, or a processed version thereof, to be transmitted to another device or system.

15. A hearing device according to claim 1, the hearing device being constituted by or comprising an air-conduction type hearing aid or a headset or earphones, or a combination thereof.

* * * * *